US012469388B2

(12) United States Patent
Ramamurthy et al.

(10) Patent No.: US 12,469,388 B2
(45) Date of Patent: Nov. 11, 2025

(54) PATH PREDICTION BASED ON INTERSECTION INFORMATION FROM MAP MESSAGES

(71) Applicant: DENSO CORPORATION, Kariya (JP)

(72) Inventors: Dhyana Ramamurthy, Novi, MI (US); Aaron Weinfield, Encinitas, CA (US); Brian Gallagher, Carlsbad, CA (US); Susan Graham, Solana Beach, CA (US)

(73) Assignee: DENSO CORPORATION, Kariya (JP)

( * ) Notice: Subject to any disclaimer, the term of this patent is extended or adjusted under 35 U.S.C. 154(b) by 667 days.

(21) Appl. No.: 17/710,256

(22) Filed: Mar. 31, 2022

(65) Prior Publication Data

US 2023/0316912 A1   Oct. 5, 2023

(51) Int. Cl.
G08G 1/0967   (2006.01)
G08G 1/01   (2006.01)
G08G 1/052   (2006.01)
G08G 1/16   (2006.01)

(52) U.S. Cl.
CPC ..... *G08G 1/096783* (2013.01); *G08G 1/0116* (2013.01); *G08G 1/052* (2013.01); *G08G 1/161* (2013.01)

(58) Field of Classification Search
CPC .......... G08G 1/096783; G08G 1/0116; G08G 1/052; G08G 1/161
See application file for complete search history.

(56) References Cited

U.S. PATENT DOCUMENTS

| | | | | |
|---|---|---|---|---|
| 11,024,166 | B2 * | 6/2021 | Pellolio | G08G 1/0133 |
| 2005/0073438 | A1 * | 4/2005 | Rodgers | G08G 1/161 |
| | | | | 340/944 |
| 2017/0113683 | A1 * | 4/2017 | Mudalige | B60W 30/0956 |
| 2018/0144637 | A1 | 5/2018 | Ikedo et al. | |
| 2019/0078897 | A1 | 3/2019 | Sumizawa | |
| 2019/0287401 | A1 * | 9/2019 | Aoude | G08G 1/0129 |
| 2020/0108833 | A1 * | 4/2020 | Sim | G05D 1/0246 |
| 2020/0322897 | A1 * | 10/2020 | Hwang | H04L 1/1861 |
| 2021/0095977 | A1 * | 4/2021 | Gao | G08G 1/096725 |

* cited by examiner

*Primary Examiner* — Scott A Browne
*Assistant Examiner* — Shahira Baajour
(74) *Attorney, Agent, or Firm* — Harness, Dickey & Pierce, P.L.C.

(57) ABSTRACT

A path prediction system includes a transceiver, a memory and a control module. The transceiver is configured to receive a map message at a host vehicle, the map message comprising path information of vehicles through an intersection. The memory is configured to store map data including global navigation satellite system information. The control module is configured to (i) determine if the host vehicle is approaching, at or in an intersection based on the map data, (ii) in response to determining that the host vehicle is approaching, at or in the intersection, predict a path of the host vehicle through the intersection based on the path information, and (iii) based on the predicted path of the host vehicle, perform at least one collision warning operation.

23 Claims, 21 Drawing Sheets

PATH PREDICTION BASED ON INTERSECTION INFORMATION FROM MAP MESSAGES

FIELD

The present disclosure relates to vehicle path tracking and broadcasting systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle-to-everything (V2X) system implements vehicle-to-vehicle (V2V) communication and vehicle-to-infrastructure (V2I) communication. In a V2X system, map messages can be transmitted including data indicating paths of vehicles on roadways and between intersections. The map messages can be transmitted from roadside units (RSUs) and received at vehicles. A vehicle can utilize the map data for location and navigation purposes and/or to avoid collisions with other vehicles and/or objects.

SUMMARY

This section provides a general summary of the disclosure, and is not a comprehensive disclosure of its full scope or all of its features.

A remote station is disclosed and includes a transceiver, a memory and a control module. The memory is configured to store (i) baseline static paths of vehicles moving through an intersection, and (ii) map data. The control module is configured to obtain road obstruction information, based on the baseline static paths and the map data, determine whether the road obstruction information affects one or more of the baseline static paths of the vehicles through the intersection and update the one or more baseline static paths based on the road obstruction information, and broadcast, via the transceiver, a map message indicating the updated one or more baseline static paths.

In other features, the baseline static paths are predicted vehicle paths through the intersection from ingress lanes leading to the intersection to egress lanes leaving the intersection. In other features, the baseline static paths include two-dimensional or three-dimensional path information. In other features, the control module is configured to determine at a predetermined frequency whether the road obstruction information affects any of the baseline static paths.

In other features, the control module is configured to: determine dynamic paths based on at least one of camera, other sensor data or basic safety messages; compare the dynamic paths to the baseline static paths; and update the baseline static paths based on results of the comparison between the dynamic paths and the baseline static paths. In other features, the dynamic paths are actual vehicle paths through the intersection from ingress lanes leading to the intersection to egress lanes leaving the intersection.

In other features, the road obstruction information includes at least one of lane closure information or road closure information. In other features, the road obstruction information includes accident information. In other features, the road obstruction information includes road repair information. In other features, the remote station is implemented as an intersection camera, a traffic light, a RSU, a cloud-based server, a backend server, or an edge computing device.

In other features, the control module is configured to: connect to one or more intersection cameras; track movement of vehicles through the intersection based on signals from the one or more intersection cameras; and update the baseline static paths based on the tracked movement of the vehicles.

In other features, the transceiver communicates with the one or more intersection cameras via an Ethernet connection, a Long-Term Evolution connection, a fifth-generation (5G) connection, or a wireless fidelity (Wi-Fi) connection.

In other features, the remote station further includes a camera configured to capture images of the intersection. The control module is configured to track movement of vehicles through the intersection based on the captured images, and update the baseline static paths based on the tracked movement of the vehicles.

In other features, the control module is configured to (i) connect to a cloud-based server, an edge computing device, or a backend server and collect captured images from one or more cameras of the intersection, the one or more cameras tracking vehicles through the intersection, and (ii) update the baseline static paths based on the tracked movement of the vehicles.

In other features, the control module is configured to (i) receive captured images from a camera having a field-of-view covering at least a portion of the intersection, (ii) based on the captured images, convert locations of objects in the intersection to three-dimensional global position system coordinates, and (iii) update the baseline static paths based on the three-dimensional position system coordinates.

In other features, the control module is configured to: tag data of the vehicle and track a path of the vehicle through the intersection from an ingress lane to an egress lane; determine a speed and a yaw rate of the vehicle through the intersection; based on the tracked path of the vehicle and the speed and the yaw rate of the vehicle, calculate three-dimension vehicle locations in the intersection and in multiple frames; and update the baseline static paths based on the three-dimensional vehicle locations. In other features, the control module is configured to: receive basic safety messages from one or more vehicles; and update the baseline static paths based on the basic safety messages.

In other features, the control module is configured to: receive data from one or more cameras having a field-of-view covering at least a portion of the intersection; fuse the received data from the one or more cameras with data in the basic safety messages to provide a collective data set; and update the baseline static paths based on the collective data set including storing at least one of a node list or a radius of curvature of a path of the one or more vehicles through the intersection.

In other features, a remote station is disclosed and includes a transceiver, a memory and a control module. The memory is configured to store baseline static paths and dynamic paths of vehicles through an intersection, where the baseline static paths refer to at least one of previous predetermined paths, averaged paths or historical paths, and where the dynamic paths refer to current detected paths. The control module is configured to (i) compare the dynamic paths to the baseline static paths, (ii) determine whether there is statistical significance between the dynamic paths and the baseline static paths, (iii) broadcast via the transceiver a first map message indicating the dynamic paths in response to there being statistical significance between the dynamic paths and the baseline static paths, and (iv) broadcast via the transceiver a second map message indicating the baseline static paths in response to there not being statistical significance between the dynamic paths and the baseline static paths.

In other features, the control module is configured to average trajectories of vehicles to create a set of nodes or a turning radius to determine one of the dynamic paths. In other features, there is a statistical significance between the dynamic paths and the baseline static paths when a difference between the dynamic paths and the baseline static paths is greater than a predetermined amount. In other features, there is a statistical significance between the dynamic paths and the baseline static paths when at least a portion of the dynamic paths deviates from the baseline static paths by more than a predetermined amount. In other features, there is a statistical significance between the dynamic paths and the baseline static paths when an average difference between nodes of one of the dynamic path and nodes of one of the baseline static paths exceeds a predetermined amount. In other features, there is a statistical significance between the dynamic paths and the baseline static paths when a predetermined percentage of differences between nodes of one of the dynamic paths and nodes of one of the baseline static paths is greater than a predetermined percentage.

In other features, the control module is configured to adjust a window duration for tracking the vehicles to determine the dynamic paths. In other features, the control module is configured to adjust a frequency at which trajectories of the vehicles are averaged to determine an averaged dynamic path and when a difference between the averaged dynamic path and at least one of the baseline static paths is statistically significant, broadcasting the map message to include the averaged dynamic path.

In other features, the map message includes intersection box path data indicating locations of the vehicles in the intersection. In other features, the map message is a vehicle-to-everything type map message.

In other features, the control module is configured to: obtain map data and road obstruction information; based on the baseline static paths and the map data, determine whether the road obstruction information affects one or more of the baseline static paths of the vehicles through the intersection and update the one or more baseline static paths based on the road obstruction information; and broadcast, via the transceiver, a third map message indicating the updated one or more baseline static paths.

In other features, a remote station is disclosed and includes a transceiver, a memory and a control module. The memory is configured to store first path data of vehicles through an intersection. The control module is configured to (i) receive at least one of road obstruction information or current vehicle path information, (ii) update the first path data based on the at least one of the road obstruction information or the current vehicle path information, and (iii) broadcast via the transceiver a first map message including the updated first path data, the map message includes first data elements, where the first data elements defining a vehicle path through the intersection.

In other features, the map message is a vehicle-to-everything type map message. In other features, the first data elements includes at least one of (i) a radius of curvature of a path through the intersection, (ii) a node list of locations of the path through the intersection, (iii) latitude and longitudinal coordinates of points along the path through the intersection.

In other features, the map message includes a generic lane frame including second data elements and a connected to frame, the connected to frame includes connection frames, and one of the connection frames includes the intersection path frame.

In other features, the second data elements include two or more of (i) a frame identifier, (ii) a name, (iii) lane attributes, (iv) an ingress approach, (v) an egress approach, (vi) maneuvers, or (vii) a node list. In other features, the map message has a tree structure including (i) the generic lane frame at a first level of the tree structure, (ii) the second data elements and the connected to frame at a second level of the tree structure, (iii) the connection frames at a third level of the tree structure, (iv) the intersection path frame at a fourth level of the tree structure, and (v) the first data elements at a fifth level of the tree structure.

In other features, the first path data includes baseline static paths. The control module is configured to (i) receive the road obstruction information, and (ii) update the first path data based on the road obstruction information.

In other features, the road obstruction information includes at least one of lane closure information, road closure information, accident information, or road repair information.

In other features, the first path data includes baseline static paths and dynamic paths. The control module is configured to (i) compare the current vehicle path information to the baseline static paths, (ii) determine whether there is a statistical significance between the current vehicle path information and the baseline static paths, (iii) broadcast via the transceiver the first map message indicating the current vehicle path information in response to there being a statistical significance between the current vehicle path information and the baseline static paths, (iv) broadcast via the transceiver a second map message indicating the baseline static paths in response to there not being a statistical significance between the current vehicle path information and the baseline static paths.

In other features, a remote station is provided and includes a transceiver, a memory and a control module. The memory is configured to store first path data of vehicles through an intersection. The control module is configured to (i) receive at least one of road obstruction information or current vehicle path information, (ii) update the first path data based on the at least one of the road obstruction information or the current vehicle path information, and (iii) broadcast via the transceiver a map message including the updated first path data, where the map message includes (a) a connection frame including an intersection path frame identifier connector to an intersection path frame in the map message, and (ii) the intersection path frame including first data elements, the first data elements defining a vehicle path through the intersection.

In other features, the map message is a vehicle-to-everything type map message. In other features, the first data elements includes at least one of (i) a radius of curvature of a path through the intersection, (ii) a node list of locations of the path through the intersection, (iii) latitude and longitudinal coordinates of points along the path through the intersection.

In other features, the map message includes a generic lane frame including second data elements and the connected to frame, the connected to frame includes connection frames, and one of the connection frames includes the intersection path frame identifier connector. In other features, the intersection path frame identifier connector refers to the intersection path frame, which is one of multiple frames of the generic lane frame.

In other features, the map message has a tree structure including (i) the generic lane frame at a first level of the tree structure, (ii) the second data elements, the connected to frame and the intersection path frame at a second level of the tree structure, (iii) the connection frames at a third level of the tree structure, (iv) the intersection path frame identifier and the first data elements at a fourth level of the tree structure separated from the intersection path frame identifier.

In other features, the second plurality of data elements include two or more of (i) a frame identifier, (ii) a name, (iii) lane attributes, (iv) an ingress approach, (v) an egress approach, (vi) maneuvers, or (vii) a node list. In other features, the first path data includes baseline static paths. The control module is configured to (i) receive the road obstruction information, and (ii) update the first path data based on the road obstruction information. In other features, the road obstruction information includes at least one of lane closure information, road closure information, accident information, or road repair information.

In other features, the first path data includes baseline static paths and dynamic paths. The control module is configured to (i) compare the current vehicle path information to the baseline static paths, (ii) determine whether there is a statistical significance between the current vehicle path information and the baseline static paths, (iii) broadcast via the transceiver the first map message indicating the current vehicle path information in response to there being a statistical significance between the current vehicle path information and the baseline static paths, (iv) broadcast via the transceiver a second map message indicating the baseline static paths in response to there not being a statistical significance between the current vehicle path information and the baseline static paths.

In other features, a path prediction system is disclosed and includes a transceiver, a memory and a control module. The transceiver is configured to receive a map message at a host vehicle, the map message including path information of vehicles through an intersection. The memory is configured to store map data including global navigation satellite system information. The control module is configured to (i) determine if the host vehicle is approaching, at or in an intersection based on the map data, (ii) in response to determining that the host vehicle is approaching, at or in the intersection, predict a path of the host vehicle through the intersection based on the path information, and (iii) based on the predicted path of the host vehicle, perform at least one collision warning operation.

In other features, the control module is configured to predict the path of the host vehicle based on at least one of a node list or a radius of curvature of a vehicle path through the intersection along with a latitude and longitude of a center point of the radius of curvature. The map message includes the at least one of the node list or the radius of curvature of a vehicle path through the intersection.

In other features, the control module is configured to predict the path independent of speed of the host vehicle and yaw rate of the host vehicle. In other features, the control module is configured to (i) obtain at least one of a vehicle speed or a yaw rate of the vehicle in the intersection, and (ii) predict the path of the host vehicle based on the at least one of the vehicle speed or yaw rate of the host vehicle in the intersection.

In other features, the control module is configured to perform, based on the predicted path of the host vehicle, at least one of a forward collision warning operation or a pedestrian collision warning operation. In other features, the control module is configured to, based on the global navigation satellite system information, determine a location of the host vehicle, generate a basic safety message indicating the location of the host vehicle, and transmit the basic safety message.

In other features, the control module is configured to (i) determine whether the map data of the host vehicle includes at least one of a node list or radii of curvature of vehicle paths through the intersection, and (ii) in response to the map data including the at least one of a node list or radii of curvature of vehicle paths through the intersection, use the map data to predict the path of the host vehicle.

In other features, the control module is configured to, in response to the map data not including at least one of a node list or radii of curvature of vehicle paths through the intersection, predict the path of the host vehicle based on at least one of speed or yaw rate of the host vehicle.

In other features, the control module is configured to, in response to the map data including the at least one of a node list or radii of curvature of vehicle paths through the intersection, generate a basic safety message based on the predicted path of the host vehicle.

In other features, the control module is configured to (i) determine whether the host vehicle has left the intersection, and (ii) in response to the host vehicle having left the intersection, transition from predicting the path of the host vehicle based on the map data to predicting the path of the host vehicle based on at least one of speed or yaw rate of the host vehicle. In other features, the map message is received from a roadside unit, which is monitoring the intersection.

In other features, a path prediction system is disclosed and includes a transceiver, a memory and a control module. The transceiver is configured to receive a map message at a host vehicle, the map message including path information of vehicles through an intersection. The memory is configured to store map data including global navigation satellite system information. The control module is configured to (i) determine if the host vehicle is approaching, at or in an intersection based on the map data, (ii) in response to determining that the host vehicle is approaching, at or in the intersection, predict a path of the host vehicle through the intersection based on the path information, and (iii) based on the predicted path of the host vehicle, determine a location of the host vehicle, generate a basic safety message indicating the location of the host vehicle, and transmit the basic safety message.

In other features, the control module is configured to predict the path of the host vehicle based on at least one of a node list or a radius of curvature of a vehicle path through the intersection. The map message includes the at least one of the node list or the radius of curvature of a vehicle path through the intersection.

In other features, the control module is configured to predict the path independent of speed of the host vehicle and yaw rate of the host vehicle. In other features, the control module is configured to (i) obtain at least one of a vehicle speed or a yaw rate of the vehicle in the intersection, and (ii) predict the path of the host vehicle based on the at least one of the vehicle speed or yaw rate of the host vehicle in the intersection.

In other features, the control module is configured to perform, based on the predicted path of the host vehicle, at least one of a forward collision warning operation or a pedestrian collision warning operation. In other features, the control module is configured to (i) determine whether the map data of the host vehicle includes at least one of a node list or radii of curvature of vehicle paths through the intersection, and (ii) in response to the map data including the at least one of a node list or radii of curvatures of vehicle paths through the intersection, use the map data to predict the path of the host vehicle. In other features, the control module is configured to, in response to the map data not including at least one of a node list or radii of curvatures of vehicle paths through the intersection, predict the path of the host vehicle based on at least one of speed or yaw rate of the host vehicle.

In other features, the control module is configured to (i) determine whether the host vehicle has left the intersection, and (ii) in response to the host vehicle having left the intersection, transition from predicting the path of the host vehicle based on the map data to predicting the path of the host vehicle based on at least one of speed or yaw rate of the host vehicle. In other features, the map message is received from a roadside unit, which is monitoring the intersection.

In other features, a pedestrian collision warning system is disclosed and includes a transceiver, a memory and a control module. The transceiver is configured to receive a personal safety message and a map message at a host vehicle. The memory is configured to store map data. The control module is configured to (i) based on the personal safety message and the map message, determine possible conflict boxes in which the host vehicle and a pedestrian are predicted to be in at a same time depending on a path of the host vehicle, (ii) based on the map data and the map message, determine a most likely path of the host vehicle through the intersection from possible paths through the intersection, (iii) based on the most likely path of the host vehicle and the possible conflict boxes, determine whether the host vehicle and the pedestrian will be in one of the possible conflict boxes at a same time, and (iv) in response to determining that the host vehicle and the pedestrian will be in the one of the possible conflict boxes at a same time, alert at least one of an occupant of the host vehicle or the pedestrian via a vulnerable road user device of a potential collision.

In other features, the personal safety message is received from a roadside unit that is separate from the host vehicle, the roadside unit is separate from the pedestrian collision warning system, which is implemented at the host vehicle. In other features, the personal safety message is received from the vulnerable road user device that is separate from the host vehicle, the vulnerable road user device is separate from the pedestrian collision warning system, which is implemented at the host vehicle. In other features, the map message is received from a roadside unit, which is monitoring the intersection. In other features, the map message is received from a cloud-based server.

In other features, the control module is configured to (i) determine whether the host vehicle is moving, and (ii) when the host vehicle is not moving, determine the possible conflict boxes in which the host vehicle and a pedestrian are predicted to be in at a same time depending on a path of the host vehicle. In other features, the control module is configured to (i) determine whether the host vehicle is starting to move, and (ii) in response to the host vehicle starting to move, determine the most likely path of the host vehicle through the intersection and determine whether the host vehicle and the pedestrian will be in one of the possible conflict boxes at a same time.

In other features, the control module is configured to (i) determine whether the host vehicle is starting to move, and (ii) in response to the host vehicle starting to move, determine the most likely path of the host vehicle through the intersection and determine whether the host vehicle and the pedestrian will be in one of the possible conflict boxes at a same time. In other features, the control module is configured to (i) determine whether the host vehicle is approaching an intersection, and (ii) in response to the host vehicle approaching the intersection, determine the possible conflict boxes.

In other features, a pedestrian collision warning method is disclosed and includes: receiving a personal safety message and a map message at a host vehicle; obtaining map data from a memory; based on the personal safety message and the map message, determining possible conflict boxes in which the host vehicle and a pedestrian are predicted to be in at a same time depending on a path of the host vehicle; based on the map data and the map message, determining a most likely path of the host vehicle through the intersection from possible paths through the intersection; based on the most likely path of the host vehicle and the possible conflict boxes, determining whether the host vehicle and the pedestrian will be in one of the possible conflict boxes at a same time; and in response to determining that the host vehicle and the pedestrian will be in the one of the possible conflict boxes at a same time, alerting at least one of an occupant of the host vehicle or the pedestrian via a vulnerable road user device of a potential collision.

In other features, the personal safety message is received from a roadside unit that is separate from the host vehicle, the roadside unit is separate from the pedestrian collision warning system, which is implemented at the host vehicle. In other features, the personal safety message is received from the vulnerable road user device that is separate from the host vehicle, the vulnerable road user device is separate from the pedestrian collision warning system, which is implemented at the host vehicle.

In other features, the map message is received from a roadside unit, which is monitoring the intersection. In other features, the map message is received from a cloud-based server. In other features, the pedestrian collision warning method further includes: determining whether the host vehicle is moving; and when the host vehicle is not moving, determining the possible conflict boxes in which the host vehicle and a pedestrian are predicted to be in at a same time depending on a path of the host vehicle.

In other features, the pedestrian collision warning method further includes: determining whether the host vehicle is starting to move; and in response to the host vehicle starting to move, determining the most likely path of the host vehicle through the intersection and determine whether the host vehicle and the pedestrian will be in one of the possible conflict boxes at a same time. In other features, the pedestrian collision warning method further includes: determining whether the host vehicle is starting to move; and in response to the host vehicle starting to move, determining the most likely path of the host vehicle through the intersection and determine whether the host vehicle and the pedestrian will be in one of the possible conflict boxes at a same time. In other features, the pedestrian collision warning method further includes: determining whether the host vehicle is approaching an intersection; and in response to the host vehicle approaching the intersection, determining the possible conflict boxes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
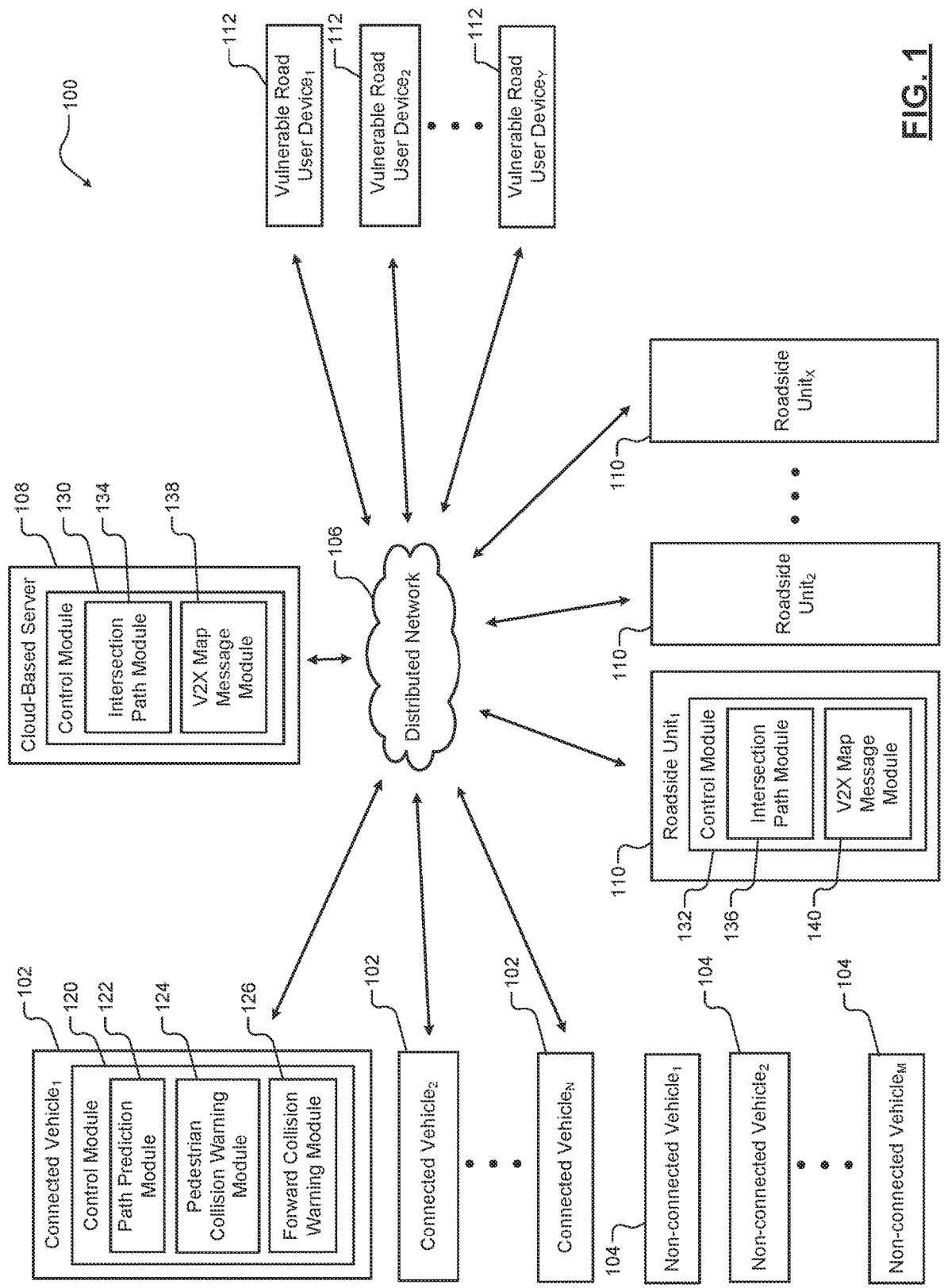
FIG. 1 is a functional block diagram of an example intersection-based vehicle path monitoring and responding system (IVPMRS) in accordance with the present disclosure.

A significant percentage (e.g., 40%) of vehicle accidents occur in intersections. V2X communication can be used to improve intersection safety and includes V2I and V2V applications, such as red-light violation warning (RLVW) applications and intersection movement assist (IMA) applications. V2X communication is also used to detect collision threats with vulnerable road users (VRUs), such as pedestrians, bicyclists, etc. Alerting a driver that there is a potential collision between a VRU in a crosswalk and a vehicle can be difficult because traditional collision warning systems are unable to accurately predict paths of vehicles through intersections, especially after a stop. This is due to two main factors. The first factor refers to traditional vehicle path prediction algorithms, which are not typically accurate unless a turning radius of the vehicle is constant. The second factor is that a map message does not traditionally include information on potential vehicle paths within an intersection.

The examples set forth herein include systems for accurately predicting paths of vehicles through intersections. An intersection refers to an area (or box) between ingress and egress lanes and typically includes one or more traffic lights. Traffic from different directions enter and leave the intersection. The ingress lanes extend (or lead) up to the intersection and egress lanes extend from (or leave) the intersection. An intersection is a junction of a roadway where two or more roads converge, diverge, meet or cross at the same height. An example of a typical intersection includes an area where two orthogonal roads cross. In this example, the geographical area where the two roads cross is referred to as an intersection box and may include crosswalks. Outer peripheral edges of the box may be at least partially defined by white stop lines behind which vehicles are supposed to stop while waiting for a green light indicating that passage through the intersection is permitted. Examples of intersections, crosswalks and white stop lines are shown in FIGS. 5-7, 9-12, 14, 17, 19, and 20.

The examples further include generating and transmitting map messages including vehicle path information, and performing various operations based on the vehicle path information. The vehicle path information includes baseline static paths (also referred to simply as static paths) and dynamic paths of vehicles. The static paths of vehicles through an intersection refer to predicted or ideal vehicle paths based on predetermined and/or historical vehicle paths through the intersection and map information defining the intersection. The static paths extend from ingress lanes leading to the intersection to egress lanes leaving the intersection. The dynamic paths refer to current actual paths of vehicles moving through the intersection. The dynamic paths also refer to paths extending from ingress lanes leading to the intersection to egress lanes leaving the intersection. Static path and dynamic path information may include two-dimensional (2D) and/or three-dimensional (3D) path information.

Example embodiments will now be described more fully with reference to the accompanying drawings.

FIG. 1 shows an IVPMRS 100 that may include connected vehicles 102, non-connected vehicles 104, a distributed network 106, a cloud-based (or backend) server 108, RSUs 110, and VRU devices 112. Each of the connected vehicles 102 is configured to connect to and communicate with other network devices in the IVPMRS 100. Each of the non-connected vehicles 104 are not configured to connect to and communicate with other network devices. Each of the connected vehicles 102 may include a control module 120 including a path prediction module 122, a pedestrian collision warning (PCW) module 124 and a vehicle forward collision warning (FCW) module 126. The path prediction module 122 may predict a path of the connected vehicle 102, paths of other nearby vehicles and/or paths of objects (e.g., VRUs) through intersections. These predictions may be based on map messages received from (i) one or more remote stations, such as one or more of the cloud-based server 108, the RSUs 110, and/or other remote stations disclosed herein, and/or (ii) messages broadcast by other connected vehicles 102 or VRU devices 112. Remote stations may refer to devices that are separate from, communicate with, broadcast messages to, and/or receive information from the connected vehicles 102. The modules 124, 126 and/or other collision warning modules of the connected vehicle 102 may perform collision warning operations to prevent collisions between the connected vehicle 102 and objects, such as pedestrians, VRUs, vehicles, and/or other objects including the vehicles 102, 104.

The cloud-based server 108, the RSUs 110, and/or other remote stations may generate map messages including map information and intersection path information. The other remote stations may include backend servers, edge computing devices, and/or roadside or overhead devices (e.g., cameras, traffic signals, RSUs, etc.). The intersection path information may include static paths including: nodal points of locations of vehicles along paths between ingress and egress lanes; linear trajectories between ingress and egress lanes; and/or centers of rotation with radii of curvature of curved trajectories of paths from turning lanes to egress lanes. Turning lanes may be referred to as ingress lanes, as well as other non-turning ingress lanes. The turning lanes may include left-hand and right-hand turning lanes. The paths through the intersection may be linear, non-linear and/or curved.

In the example shown, the cloud-based server 108 and the RSUs 110 may include respective control modules (e.g., control modules 130, 132) including intersection path modules (e.g., intersection path modules 134, 136) and V2X map message modules (e.g., V2X map message modules 138, 140). The intersection path modules are configured to track, store and/or predict paths of connected and non-connected vehicles and/or other objects, such as VRUs, through intersections. This may be based on past/historical paths of vehicles and objects through the intersections, road obstruction information, map information, number and types of ingress and egress lanes, etc. The road obstruction information may include accident information, road repair information, traffic congestion information, road closure information, lane closure information, etc. The road obstruction information may indicate, which lanes are closed, which lanes are open, and/or which lanes are temporarily blocked and/or include non-moving traffic. The V2X map message modules may generate map messages including path information, which may be broadcast to the connected vehicles 102 and/or the VRU devices 112. V2X communication referred to herein includes transmission of map messages and other messages, such as basic safety messages and personal safety messages. The messages may be transmitted on a 5.9 giga-hertz (GHz) frequency band.

The VRU devices 112 may be respectively implemented at VRUs (not shown in FIG. 1). The VRU devices 112 may include mobile phones, tablets, wearable network devices (e.g., smart watches), etc. The VRUs may include pedestrians, bicyclists, etc. The VRU devices 112 may be in communication with and/or receive messages from the connected vehicles 102, the cloud-based server 108, and/or RSUs 110. This communication and reception of messages may be direct or indirect via the distributed network 106. Similarly, the connected vehicles 102 may be in communication with and/or receive messages from the cloud-based server 108, RSUs 110 and/or VRU devices 112. This communication and reception of messages may be direct or indirect via the distributed network 106.

Figure 2:
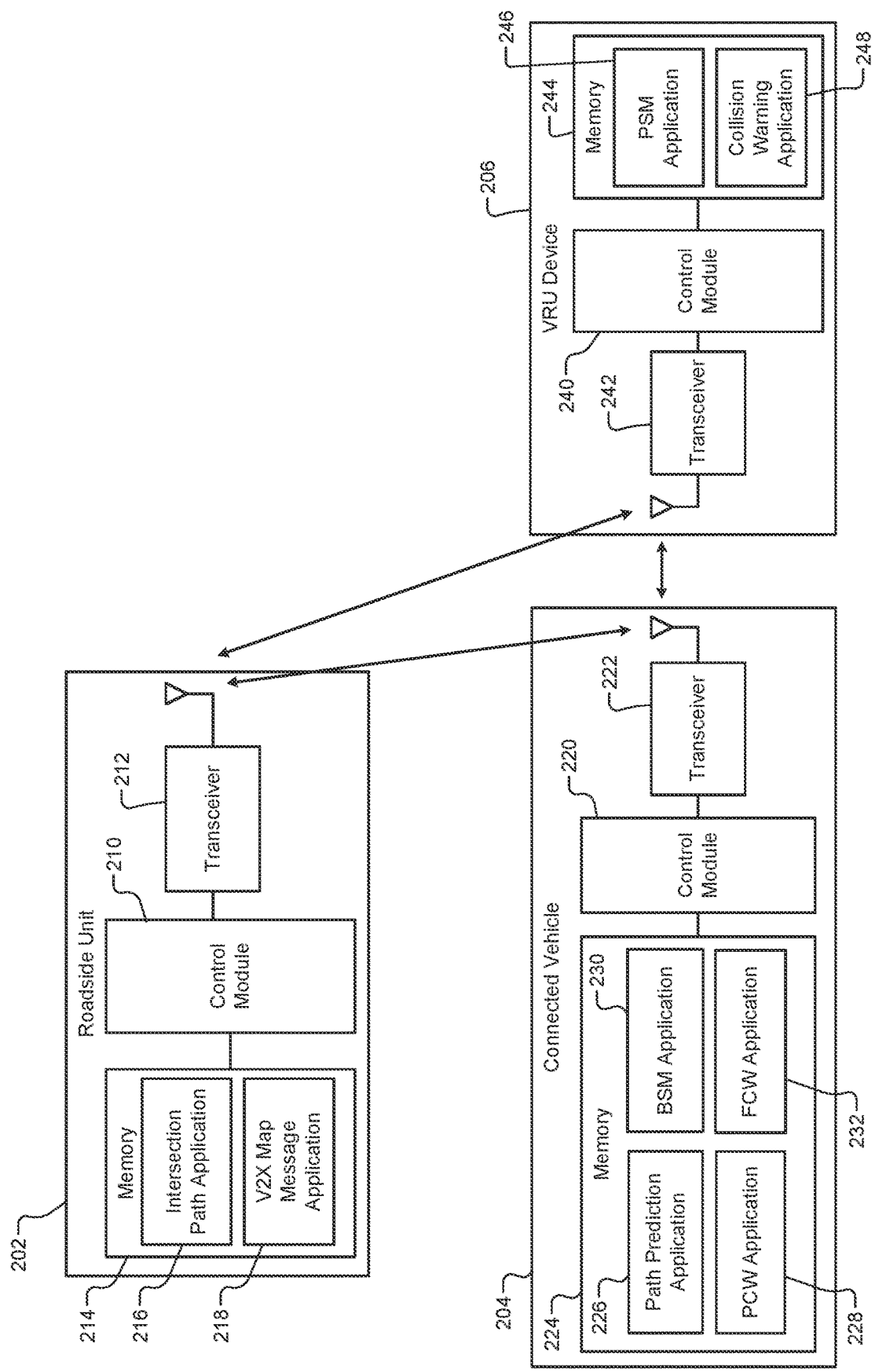
FIG. 2 is a functional block diagram of a portion of the IVPMRS of FIG. 1.

FIG. 2 shows a RSU 202, a connected vehicle 204 and a VRU device 206, which may be a portion of the IVPMRS 100 of FIG. 1. The RSU 202 may include a control module 210, a transceiver 212 and a memory 214, which stores an intersection path application 216 and a V2X message application 218. The connected vehicle 204 includes a control module 220, a transceiver 222, and a memory 224, which stores a path prediction application 226, a PCW application 228, a basic safety message (BSM) application 230, and a FCW application 232. The VRU device 206 may include a control module 240, a transceiver 242, and a memory 244, which stores a PSM application 246 and a collision warning application 248.

The applications 216, 218, 226, 228, 230, 232, 246, 248 may be executed by the control modules 210, 220, 240. The intersection path application 216 is implemented to track, store and predict paths of connected and non-connected vehicles and/or other objects through intersections. The path prediction application 226 is implemented to predict a path of the connected vehicle 204, paths of other nearby vehicles and/or paths of objects (e.g., VRUs) through intersections. The V2X message application 218 is implemented to map messages including path information, which may be broadcast to the connected vehicles 204 and/or the VRU device 206.

The applications 228, 232 are implemented to perform collision warning operations to prevent collisions between the connected vehicle 102 and objects, such as pedestrians, VRUs, vehicles and/or other objects. The BSM application 230 is implemented to generate and broadcast BSM messages indicating, for example, speeds, headings and locations of the connected vehicle 204. The PSM application 246 is implemented to generate and broadcast PSM messages indicating, for example, speeds, headings and locations of the VRU device 206 and/or corresponding VRU. The collision warning application 248 may perform collision warning operations to prevent collisions between a VRU of the VRU device 206 and objects, such as vehicles, pedestrians, VRUs and/or other objects.

Figure 3:
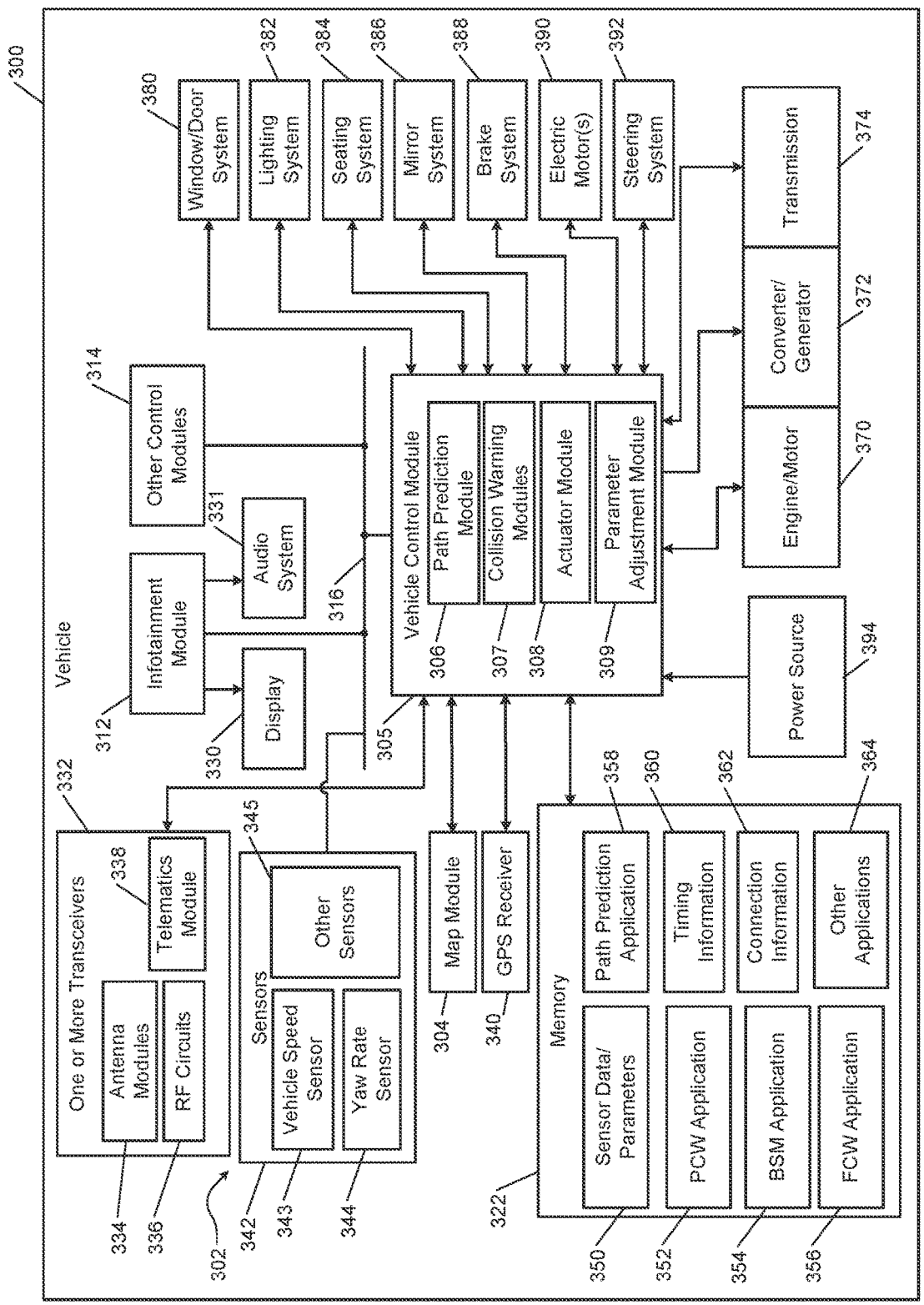
FIG. 3 is a functional block diagram of an example vehicle of the IVPMRS of FIG. 1 including an intersection path prediction module in accordance with the present disclosure.

FIG. 3 shows a vehicle 300 that may replace one of the connected vehicles 102 of the IVPMRS 100 of FIG. 1. The vehicle 300 may be a fully or partially autonomous vehicle and includes a sensor system 302, a map module 304, and a vehicle control module 305, which may include a path prediction module 306, a collision warning module 307, an actuator module 308 and a parameter adjustment module 309. The sensor system 302 provides information about the vehicle 300 such as speed and yaw rate.

The path prediction module 306 may perform similarly as the path prediction modules 122, 226 of FIGS. 1-2 and may implement the path prediction application 226 of FIG. 2. The path prediction module 306 is configured to determine trajectories that the vehicle 300 is to follow through intersections and are within geometric limits of the intersections and/or ingress and egress lanes leading to and leaving from the intersections. Path prediction performed by the path prediction module 306 may not ensure whether a trajectory is collision free. The path prediction is used by other collision avoidance modules to predict likelihood of a collision or whether the corresponding host vehicle is within prescribed lane parameters and/or satisfies one or more other parameters. The collision warning module 307 may perform similarly as the collision warning modules 124, 126 of FIG. 1 and may implement the collision warning applications 228, 232 of FIG. 2. When the vehicle 300 is an autonomous or partially autonomous vehicle, the actuator module 308 may be configured to control operation of the vehicle or a portion thereof to follow planned trajectories of the vehicle 300. When the vehicle 300 is a non-autonomous vehicle (or vehicle fully controlled by driver), the actuator module 308 or other module may provide indicators to the driver to follow planned trajectories. The planned trajectories may be determined by one or more of the modules 305-307.

The sensor system 302 provides dynamic information such as speed and yaw rate for the host vehicle). This information is provided to the modules 305-307. A map generated by, obtained by, and/or monitored by the map module 304 contains the geometric shape and characteristics of a surrounding area in a format to allow the modules 305-308 to determine where are available (permitted and feasible) driving areas and lanes. The available driving areas and lanes may be inside and outside of intersections, emergency driving areas, non-traversable areas and other semantic categories of a local road configuration.

The actuator module 308 may take the plan generated by the modules 305-307 and convert the plan to wheel, brake, and accelerator commands to affect the speed, acceleration, and heading of the ego vehicle 300. The map and object (or obstacle) information may be used to determine a best trajectory for the ego vehicle 300 to meet a goal condition (e.g., leave an ingress lane to enter an intersection, follow a particular path through the intersection, and enter a particular egress lane from the intersection).

The vehicle 300 further includes an infotainment module 312 and other control modules 314 (e.g., a body control module). The modules 305-309, 312 and/or 314 may communicate with each other via vehicle interface 316, such as a controller area network (CAN) bus, a local interconnect network (LIN), a clock extension peripheral interface (CXPI) bus and/or other vehicle interfaces. In an embodiment, sensor signals are received from the sensor system 302 via a CAN bus at the vehicle control module 305.

The vehicle control module 305 may control operation of vehicles systems and may include the modules 305, 306, 308, 309, as well as other modules. The vehicle control module 305 may also include one or more processors that are configured to execute instructions stored in a non-transitory computer-readable medium, such as the memory 322, which may include read-only memory (ROM) and/or random access memory (RAM).

The vehicle 300 may further include: a display 330; an audio system 331; and one or more transceivers 332 including antenna modules 334. The RF antenna modules 334 may include and/or be connected to RF circuits 336. The map module 304 may communicate with a telematics module 338, a global positioning system (GPS) receiver 340 and sensors 342. The one or more transceivers 332 may include the telematics module 338. The vehicle control module 305 and/or the telematics module 338 is configured to receive GPS data and correlate GPS position data of the vehicle 300 to geographical map locations.

The RF circuits 336 may be used to communicate with mobile devices, central offices, other vehicles, land-based stations, cloud-based networks, etc. including transmission of Bluetooth®, wireless fidelity (Wi-Fi) or Wi-Fi direct and/or other RF signals satisfying various wireless communication protocols. The RF circuits 336 may include radios, transmitters, receivers, etc. for transmitting and receiving RF signals. The telematics module 338 may be implemented by a global navigation satellite system (e.g., GPS), inertial navigation system, global system for mobile communication (GSM) system, and/or other location system. The telematics module 338 may provide map information including road and object information, such as: locations, speed, acceleration, heading of vehicles; locations of objects; distances between objections; distances between a current location an intermediary and/or target destinations; etc. This information may be provided to the map module 304.

The sensors 342 may include sensors used for path prediction and planning and actuator operations. The sensors may include a vehicle speed sensor 343, a yaw rate sensor 344, and other sensors 345, such as cameras, objection detection sensors, temperature sensors, accelerometers, etc. The GPS receiver 340 may provide vehicle velocity and/or direction (or heading) of the vehicle 300 and/or global clock timing information.

The memory 322 may store various sensor data, parameter data, dimension states, trajectory planning information and other information. As an example, the memory 322 may store sensor and parameter data 350, a PCW application 352, a BSM application 354, a FCW application, 356, a path prediction application 358, timing information 360, connection information 362, and other applications 364. The connection information 362 may refer to information for connecting to other vehicles, mobile access devices, cloud-based servers, backend servers, remote stations, etc. The timing information 360 may refer to times the vehicle 300 is at certain locations, time to predicted destination (or nodal)

points, etc. Transitions may be time based, based on traveled distance, and/or other conditions.

The applications 352, 354, 356, 358, 364 may be implemented by the modules 305-309, 312, 314 and 338 and/or transceivers 332. The other applications 364 may include, for example, a planning application and an actuator application. The planning application may be executed by a planning module to plan a trajectory of the vehicle 300. The actuator application may be executed by the actuator module 308 to implement a trajectory plan selected by the planning module. The planning module may determine a target path for the vehicle 300 to follow. The target path may be adjusted based on a changing environment. For example, the vehicle 300 may approach or encounter one or more objects, such as fixed objects, pedestrians, and/or other vehicles and update the target path. If the vehicle 300 is an autonomous vehicle, the vehicle 300 may follow the updated target path to avoid a collision. The parameter adjustment module 309 may be used to adjust parameters of the vehicle 300.

Although the memory 322 and the vehicle control module 305 are shown as separate devices, the memory 322 and the vehicle control module 305 may be implemented as a single device.

The vehicle control module 305 may control operation of an engine or motor 370, a converter/generator 372, a transmission 374, a window/door system 380, a lighting system 382, a seating system 384, a mirror system 386, a brake system 388, electric motors 390 and/or a steering system 392 according to parameters set by the modules 305-309, 334 and/or 338.

The vehicle control module 305 may receive power from a power source 394 that may be provided to the engine or motor 370, the converter/generator 372, the transmission 374, the window/door system 380, the lighting system 382, the seating system 384, the mirror system 386, the brake system 388, the electric motors 390 and/or the steering system 392, etc. Some of the operations as a result of planning may include enabling fuel and spark of the engine or motor 370, starting the electric motors 390, powering any of the systems referred to herein, and/or performing other operations as are further described herein. In one embodiment, the vehicle 300 does not include an engine and/or a transmission and the electric motors 390 are used for vehicle propulsion and/or driving purposes.

The engine or motor 370, the converter/generator 372, the transmission 374, the window/door system 380, the lighting system 382, the seating system 384, the mirror system 386, the brake system 388, the electric motors 390 and/or the steering system 392 may include actuators controlled by the vehicle control module 305 to, for example, adjust fuel, spark, air flow, steering wheel angle, throttle position, pedal position, door locks, window position, seat angles, etc. This control may be based on the outputs of the sensors 342, the map module 304, the GPS receiver 340 and the above-stated data and information stored in the memory 322.

Figure 4:
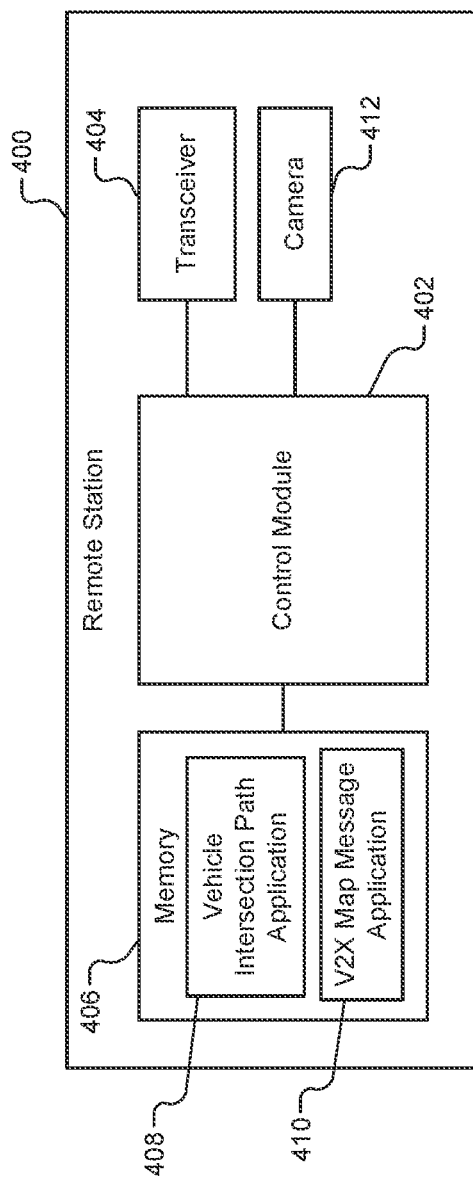
FIG. 4 is a functional block diagram of an example remote station of the IVPMRS of FIG. 1 in accordance with the present disclosure.

FIG. 4 shows a remote station 400 that may replace and/or operate similarly as the cloud-based server 108, one of the RSUs 110 of FIG. 1 and/or other remote station and/or be implemented in the IVPMRS of FIG. 1. The remote station 400 may be implemented as a backend server, a cloud-based server, a central office monitoring station, a RSU, a roadside camera (or other sensing device or system), a traffic light, an edge computing device, or other station remotely located separate from a vehicle. The remote station 400 may include a control module 402, a transceiver 404 and a memory 406, which may store an intersection path application 408 and a V2X map message application 410. The applications 408, 410 may be configured similarly as the applications 216, 218 of FIG. 2. The remote station 400, if implemented as a RSU, may include a camera 412 for capturing images of an intersection. The camera 412 may be replaced with or used in combination with one or more other sensors, such as Lidar or Radar sensors. This holds true for other intersection cameras referred to herein.

Intersection Path Information Generation

The following FIGS. 5-13 are directed to generation of valid intersection path information associated with paths of vehicles through intersections (or intersection boxes). An intersection box may refer to a box at least partially defined by, for example, white stop lines printed across ingress lanes leading to an intersection. The white stop lines may define at least a portion of a perimeter of the intersection box. The valid intersection path information may be based on intersection lane and road geometry and other existing map information.

Figure 5:
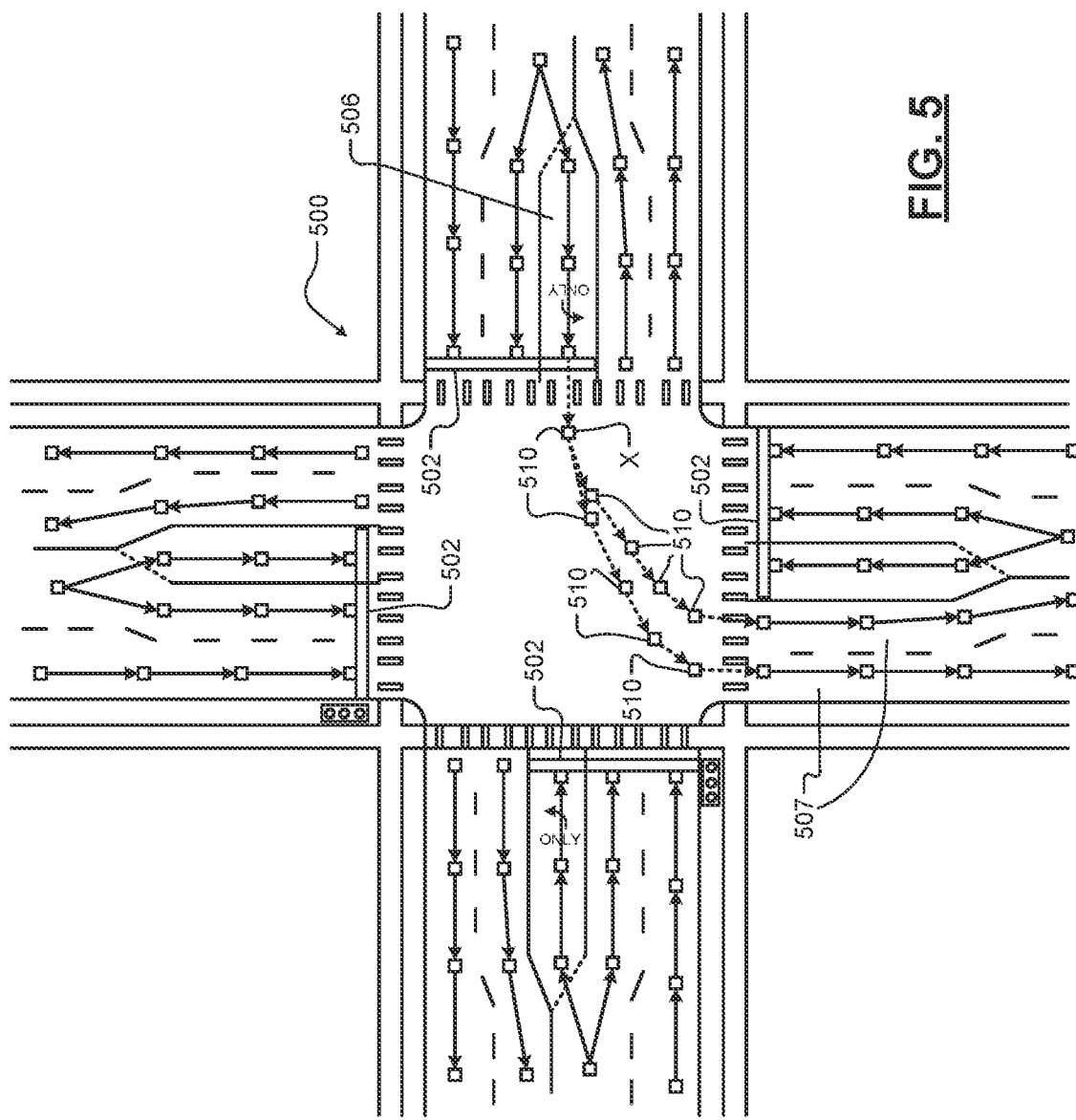
FIG. 5 is a top view of an example intersection illustrating example node sets of possible paths of a vehicle from a single turning lane to two egress lanes through the intersection in accordance with the present disclosure.

FIG. 5 shows an intersection 500 illustrating node sets of possible paths of a vehicle shown by dashed arrows from a single left turn lane 506 to two egress lanes 507 through the intersection 500. The intersection 500 includes stop lines 502. Traditional static map information only includes vehicle path information of lanes leading to the stop lines 502 and path information associated with lanes leaving the intersection 500, such as that provided by the shown solid arrows. The solid arrows directed to the intersection 500 are over ingress lanes. The solid arrows directed away from the intersection 500 are over egress lanes. The solid arrows have associated nodal sets.

The traditional static map information does not include any vehicle path information of vehicle paths within the intersection 500. The intersection path modules disclosed herein may generate static path information for vehicles paths through intersections. The static path information may include nodal information, such as longitudinal and latitudinal points (or X, Y coordinates) along vehicles paths, as shown by nodal point boxes (or nodal points) 510. The nodal points 510 are associated with a couple available paths, other nodal points exist for other available paths though the intersection 500. Each available path through the intersection 500 may have a respective node set (or list of nodes).

The intersection path information may be obtained using various techniques, such as: collecting information from manual mapping surveys performed by surveyors; monitoring vehicle paths via an intersection camera capturing images of the intersection to track paths of vehicles through the intersection 500; collecting information from connected vehicles indicating locations of the connected vehicles; collecting information from map databases; and collecting information from sensors that are portable and/or hand-held to track locations of vehicles through the intersection 500. Intersection node sets may be generated, stored and/or averaged for predicting paths of vehicles through the intersection 500. The path information may include information for available and permissible (or valid) paths of the vehicles. The paths information may not include unavailable and/or invalid paths of the vehicles. In FIG. 5, an example of two available and valid paths are shown for the left turn lane 506.

Figure 6:
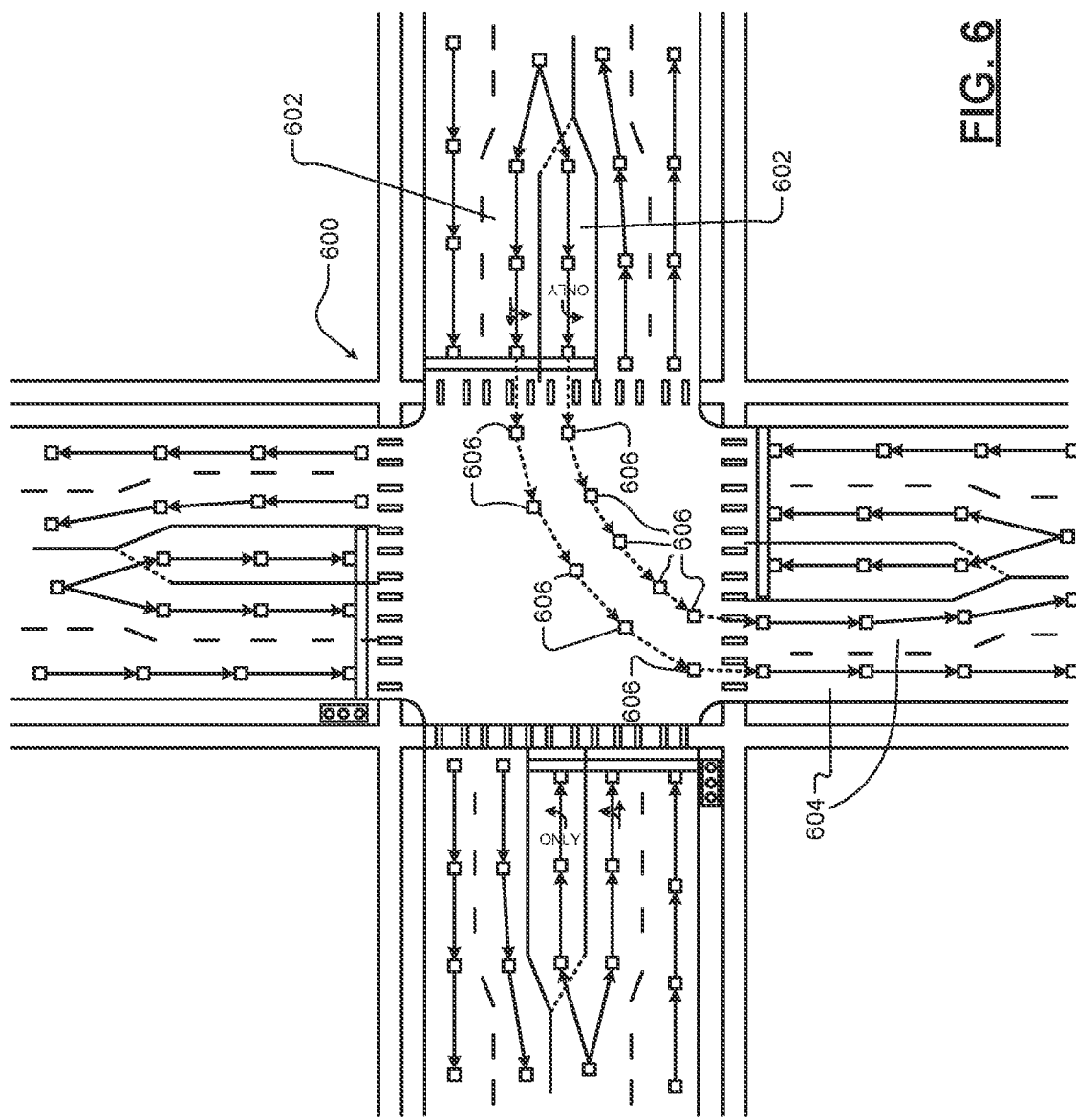
FIG. 6 is a top view of an example intersection illustrating example node sets of possible paths of a vehicle from two turning lanes to two egress lanes through the intersection in accordance with the present disclosure.

FIG. 6 shows an intersection 600 illustrating node sets of available and valid paths (referred to as possible paths) of a vehicle from two left turn lanes 602 respectively to two egress lanes 604 through the intersection 600. The possible paths, which may be referred to as static paths, are shown by dashed arrows having respective nodal points 606. In the example shown, the static paths are ideal curved paths, which may each have a particular radius of curvature. Although only two possible paths are shown in FIG. 6, the static path information for each possible path through the intersection 600 may be tracked, determined, and stored. FIG. 6 is an example, when there is no lane obstruction. Each static path has a corresponding node list including coordinates of the nodes, which may be stored in memory and/or broadcast to vehicles from a remote station, such as from any of the remote stations referred to herein.

Figure 7:
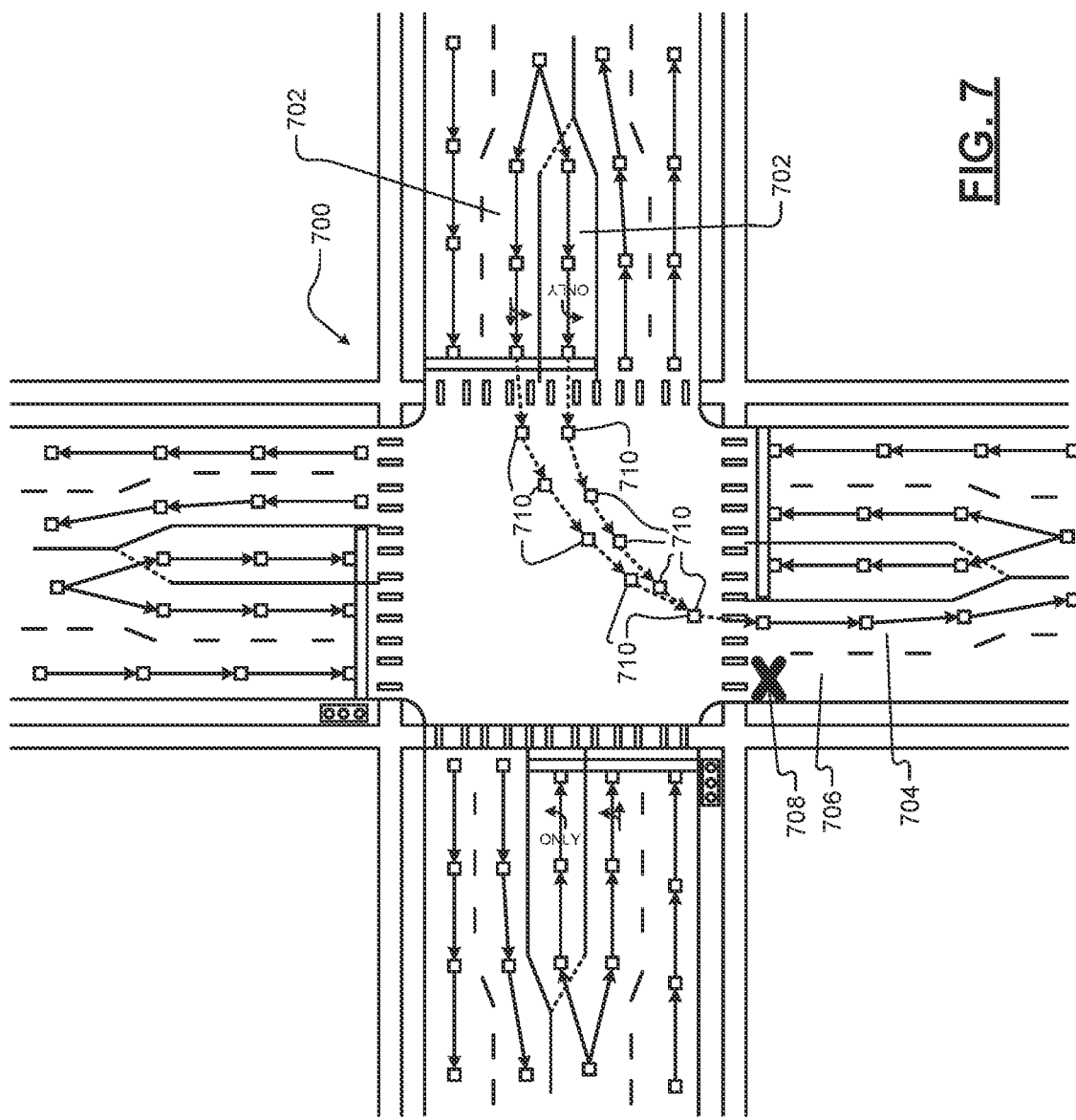
FIG. 7 is a top view of an example intersection illustrating example node sets of possible paths of a vehicle from two turning lanes to a single egress lane through the intersection due to lane obstruction in accordance with the present disclosure.

FIG. 7 shows an intersection 700 illustrating node sets of possible paths of a vehicle from two left turn lanes 702 to a single egress lane 704 through the intersection 700 due to lane obstruction. The intersection 700 may be the same intersection as intersection 600 of FIG. 6. In this example, one egress lane is closed. Egress lane 706 is obstructed, as illustrated by 'X' 708, which may refer to an accident, debris in the egress lane 706, the lane 706 having closure stands and/or barricades, or other road obstruction. Planned lane closures and obstructions are accounted for in determining and updating static path information and node lists including nodal points 710 for vehicle paths through the intersection. Road obstruction information may be received at vehicles from a central office, a backend server, a reporting agency, an edge computing device, a RSU, or other remote station. When the closure of the egress lane 706 ends, the static path information may be reverted back to the static path information similar to that provided for FIG. 6.

Although the following methods of FIGS. 8, 13, 18 and 21 are shown as separate methods, two or more of the methods and/or operations from separate methods may be combined and performed as part of a single method.

Figure 8:
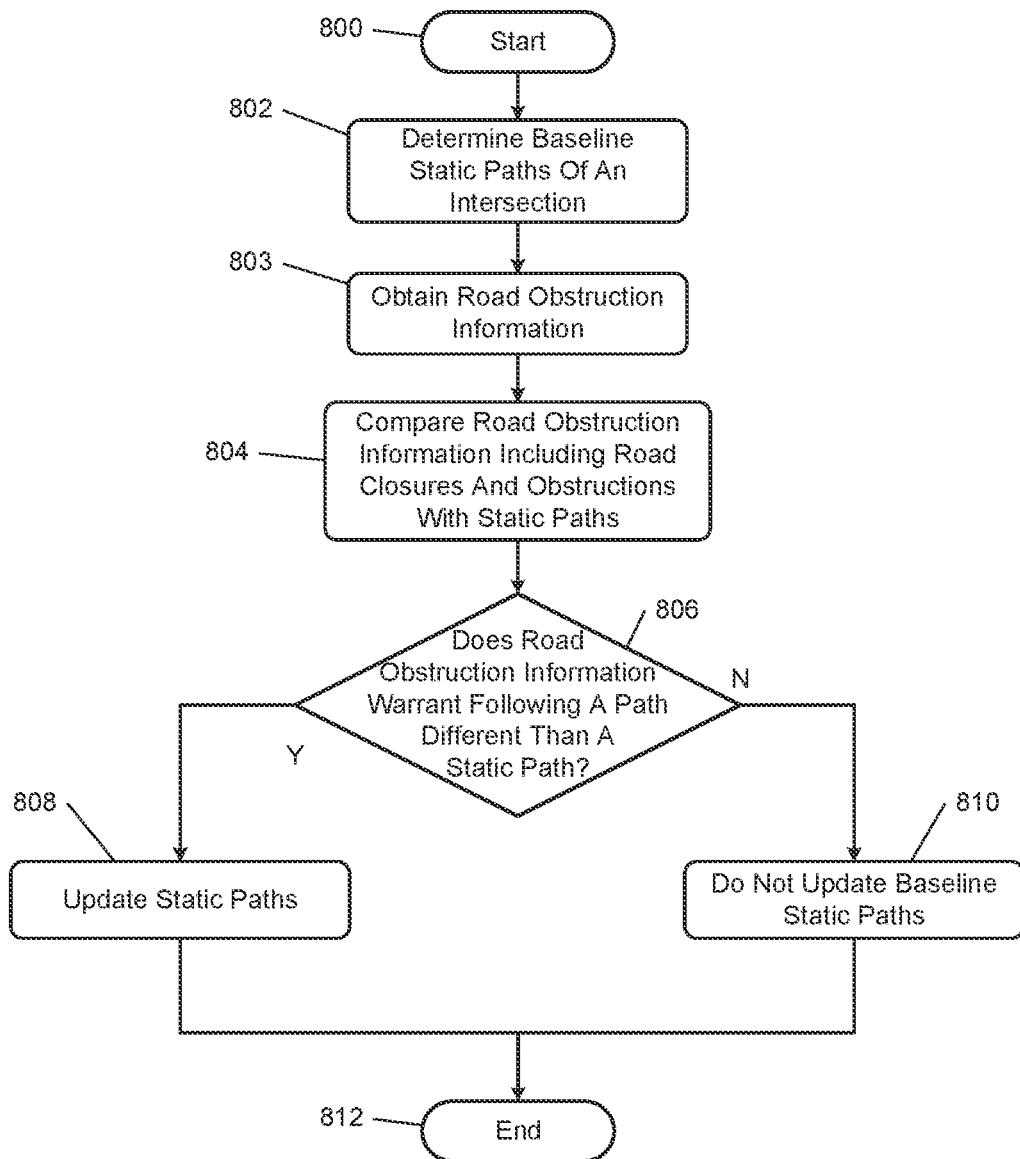
FIG. 8 illustrates an example method of a remote station updating baseline static paths in accordance with the present disclosure.

FIG. 8 shows a method of updating baseline static paths. The method may be implemented by any of the remote stations disclosed herein. The method may be iteratively and periodically performed and begin at 800.

At 802, a control module (e.g., one of the control modules 130, 132, 210, 402 of FIGS. 1-2 and 4) may determine and/or obtain baseline static paths of an intersection. This may include generating static paths based on road geometry in the intersection. At 803, the control module obtains road obstruction information, which may include any of the road obstruction information referred to herein including road and/or lane obstructions and/or closures. The road obstruction information may also indicate roads and/or lanes that are no longer closed and/or obstructed and thus open. The road obstruction information may include accident information, road and/or lane repair information, etc. This may be obtained by accessing memory of a local station and/or server of the control module and/or from a remote station and/or server.

At 804, the control module compares the obstruction information including road closures and obstructions with the baseline static paths. This comparison and/or the remainder of this method may be performed at a fixed, configurable, and/or predetermined frequency (e.g., once a day). At 806, the control module determines, based on the comparison, whether the road obstruction information warrants following a path different than a static path. If yes, operation 808 is performed, otherwise operation 810 is performed. At 808, the control module updates the static paths based on the road obstruction information to generate up-to-date baseline static paths. This may be done on an as needed basis. As an example, the static paths shown in FIG. 6 may be updated as shown in FIG. 7. At 810, the control module refrains from updating the static paths. The method may end at 812.

Figure 9:
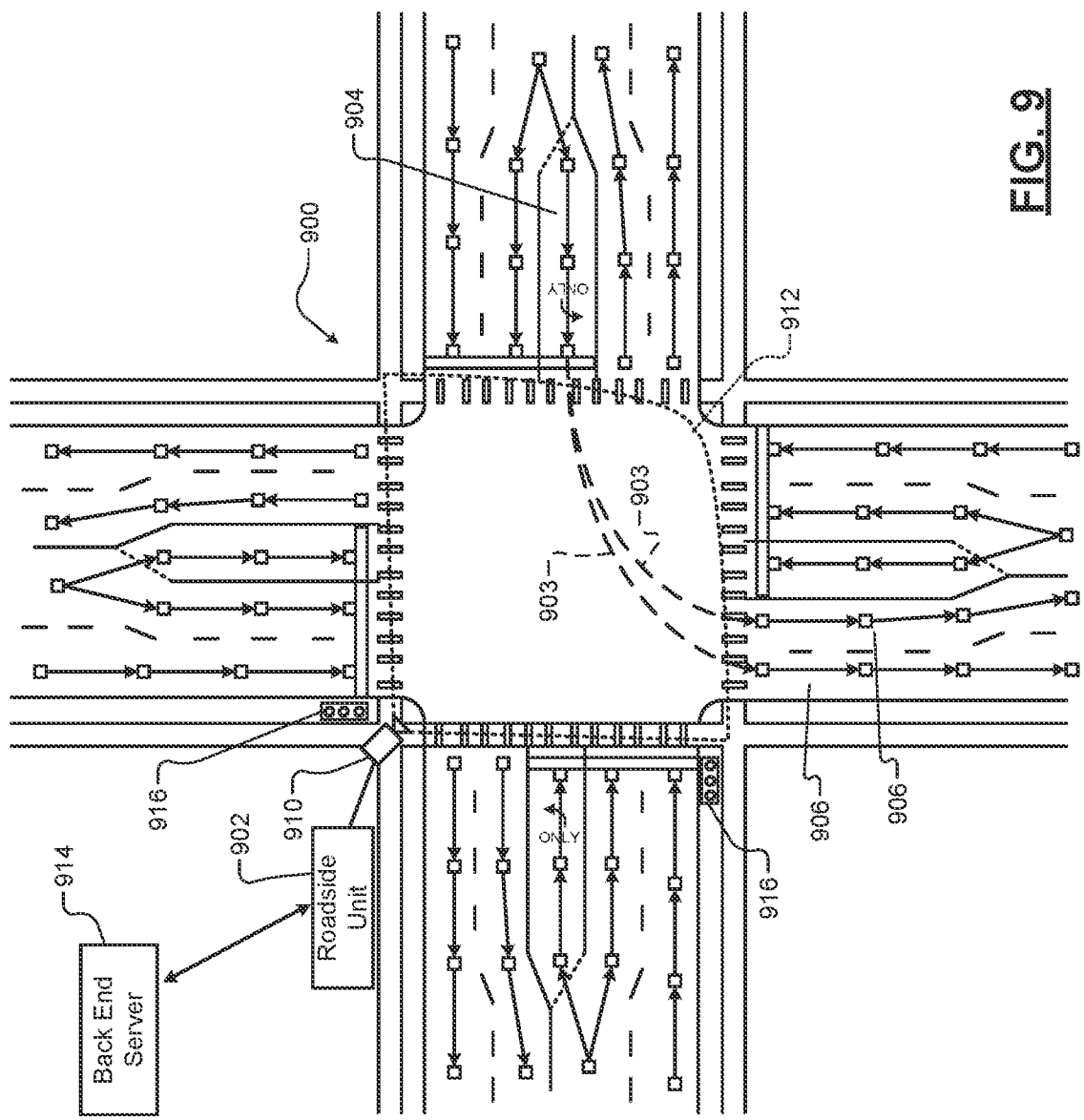
FIG. 9 is a top view of an example intersection illustrating a roadside unit (RSU) monitoring paths of vehicles from a single turning lane to two egress lanes through the intersection in accordance with the present disclosure.

FIG. 9 shows an intersection 900 illustrating a RSU 902 monitoring paths 903 of vehicles from a single turning lane 904 to two egress lanes 906 through the intersection 900. The RSU 902 may be implemented as any of the RSUs referred to herein and be connected to an intersection camera 910 that has a field-of-view (FOV) 912 and captures images of the intersection 900. The RSU 902 may also be connected to a backend server 914. The RSU 902 and the backend server 914 may share information, such as road obstruction information, static paths through the intersection, images collected by the intersection camera 910, etc. The RSU 902 may be implemented as part of the intersection camera 910 and/or one of the traffic lights 916.

The RSU 902 may: dynamically update static path information and provide the updated static path information to the backend server; collect images and/or track vehicle movement through the intersection and/or provide the images and/or tracked vehicle data to the backend server, which may then update the static path information; and/or generate dynamic path information and provide the dynamic path information to the backend server. The RSU 902 may be connected to the camera 910 and the backend server 914 via Ethernet connections, long-term evolution (LTE) connections, fifth generation (5G) mobile network connections, wireless-fidelity (Wi-Fi) connections or other wired and/or wireless connections and/or a combination thereof.

Although a single camera and two traffic lights are shown, any number of cameras and traffic lights may be implemented at the intersection. The number and locations of the cameras are set such that all inbound, outbound lanes and the entire intersection are covered by the FOVs of the cameras. Each lane and each portion of the intersection is visible in the FOV of at least one of the cameras in order to track vehicles moving to or from that lane and through the intersection.

A control module of the RSU 902 and/or a control module of the back end server 914 may store transfer functions for each of the cameras for converting object positions in images captured by the cameras to 3D global positioning system (GPS) coordinates. Two-dimensional (2D) points may be converted to 3D points. The transfer functions may be based on the focal lengths and camera projections of the cameras. The GPS coordinates are then used for updating static path information and/or for providing dynamic path information. Transfer functions may be generated for any object in the intersection including, for example, pedestrians and bicyclists on crosswalks. This is done to track movement of the objects. Nodal lists may be generated for each object.

Figure 10:
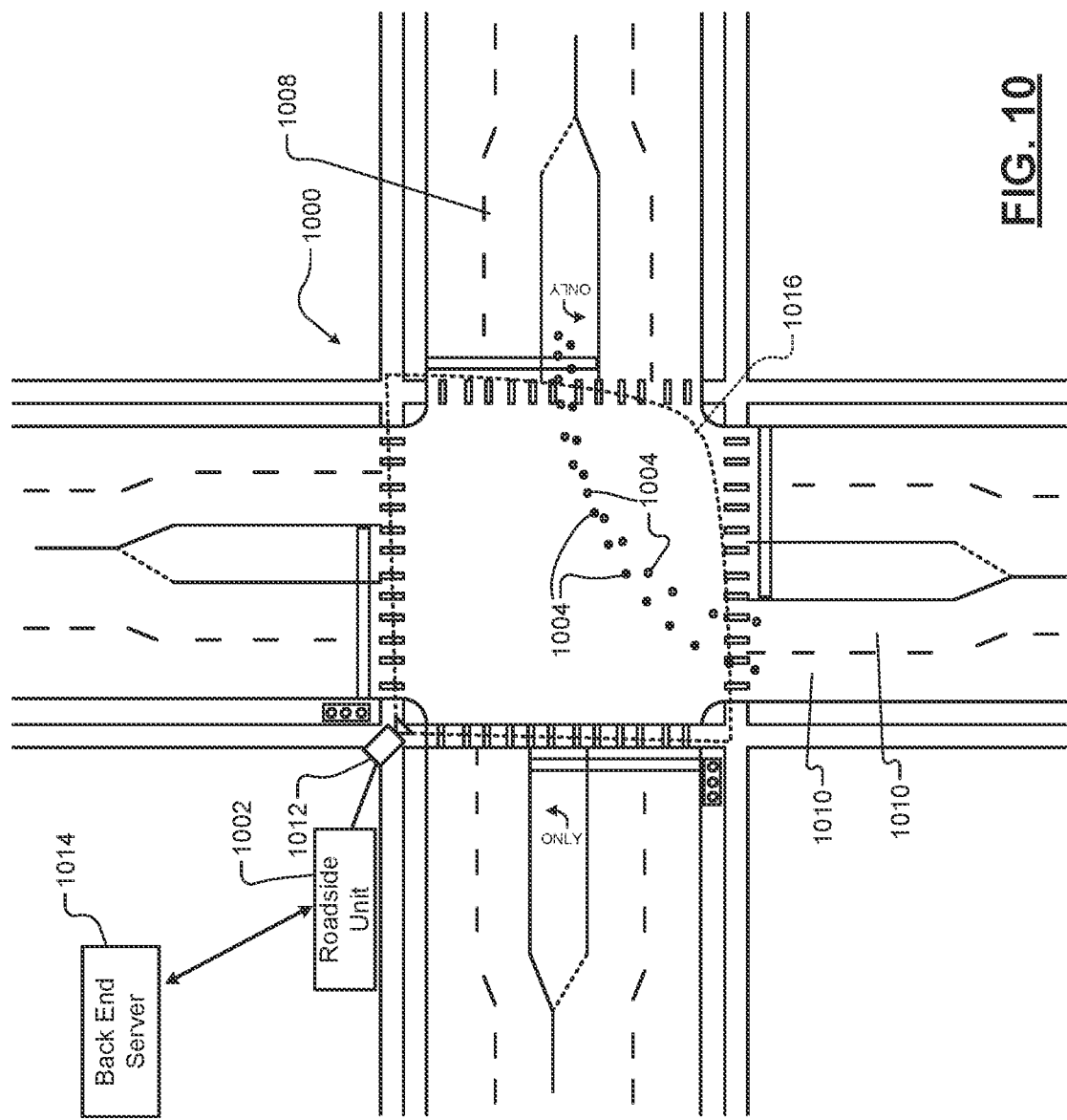
FIG. 10 is a top view of an example intersection illustrating a RSU monitoring nodal points of different paths of vehicles from a single turning lane to two egress lanes through an intersection in accordance with the present disclosure.

FIG. 10 shows an intersection 1000 illustrating a RSU 1002 monitoring nodal points 1004 of different paths of vehicles from a single turning lane 1008 to two egress lanes 1010 through the intersection 1000. The RSU 1002 is connected to a camera 1012 and a backend server 1014. The RSU 1002 may be implemented as any of the RSUs referred to herein and is connected to the intersection camera 1012 that has a FOV 1016 and captures images of the intersection 1000 at a suitable frame rate.

The RSU 1002 may: dynamically update static path information and provide the updated static path information to the backend server; collect images and/or track vehicle movement through the intersection and/or provide the images and/or tracked vehicle data to the backend server, which may then update the static path information; and/or generate dynamic path information and provide the dynamic path information to the backend server.

In one embodiment, a control module of the RSU 1002 tags each vehicle in the FOV 1016. In other words, the control module provides an identifier for each vehicle and tracks movement of each of the vehicles and records the movement, which is identified by the tags. This may include the control module tagging data of each of the vehicles. The tagged data includes tracked paths of the vehicles through the intersection from ingress lanes to egress lanes. The control module may determine speeds and yaw rates of the vehicles through the intersection. The speeds and yaw rates may be determined based on the image data, received GPS data of the vehicles, and/or speed and yaw rate information broadcasted via BSMs from the vehicles. The control module may calculate the speeds and yaw rates as the vehicles navigate through the intersection 1000. The control module may, based on the tracked path of the vehicles and the speed and yaw rate information, calculate three-dimension locations of the vehicles in images and the intersection 1000. The control module may then update baseline static paths based on the three-dimensional vehicle locations.

Although the example of FIG. 10 is described with respect to a control module of the RSU 1002, the stated operations of the control module of the RSU 1002 may be implemented by a control module of the camera 1012, the backend server 1014, and/or other remote station, such as an edge computing device. The vehicles being monitored may be connected vehicles or non-connected vehicles. The edge computing device may be a multi-access edge computing device located near the intersection 1000.

If the vehicles are connected vehicles and transmit BSMs, the BSM data of the BSM signals may be received by the RSU 1002 and/or the backend server 1014 and used in combination with or instead of the image data collected by the camera 1012 and/or any other intersection camera of the intersection 1000. The BSM and camera data may be fused together based on, for example, timestamps of the BSM data and timestamps of the camera data. By fusing together and/or using both the BSM data and the camera data, better estimates of vehicle locations can be determined and predicted.

In one embodiment and for each possible and permitted path of vehicles through the intersection 1000, the control module of the RSU 1002 and/or the backend server 1014 location data (e.g., BSM based location data and/or camera-based location data) is averaged to provide estimates and/or predictions of vehicle locations. The location data of multiple vehicles is averaged for each possible and permitted path. The locations of vehicles moving from the same ingress lane to the same egress lane are averaged. The vehicles may take slightly different paths. More specifically, the coordinates of corresponding nodal points are averaged. For example, a list of a predetermined number (e.g., 5-50) of nodal points may be provided for each vehicle moving from the same particular ingress lane to the same particular egress lane. The nodal points for a predetermined number of vehicles (e.g., 10) may be averaged. The averaging may be conducted at a predetermined frequency (e.g., once every 15 minutes). The first nodal points in the lists are averaged, the second points in the lists are averaged, etc. This may be done for each of the points in the lists and to provide a resulting nodal list of averaged nodal points. The radii of curvatures of the paths of the vehicles moving from the same ingress lane to the same egress lane may also be averaged.

In an embodiment, the location data is averaged at a fixed, configurable and/or predetermined frequency (e.g., 1-50 times per day). The averaged location data may be referred to as dynamic path data of dynamic paths of the vehicles. The averaged location data or dynamic path data may include nodal lists and/or radius of curvatures of the dynamic paths. A nodal list and/or a radius of curvature may be provided for each path. In another embodiment, the average path data is updated using a time-based moving window. A time window and frequency of updates may both be fixed, configurable and predetermined. By using a moving window, the oldest location data is removed and newly collected location data is used along with previously collected location data.

The control module of the RSU 1002 may broadcast map messages including static path information and/or dynamic path information at a predetermined frequency (e.g., 10 Hz). The map messages may be broadcast continuously or periodically. The RSU 1002 may simply broadcast the map messages or may alternatively establish links with nearby vehicles and then transmit the map messages and/or corresponding information.

Figure 11:
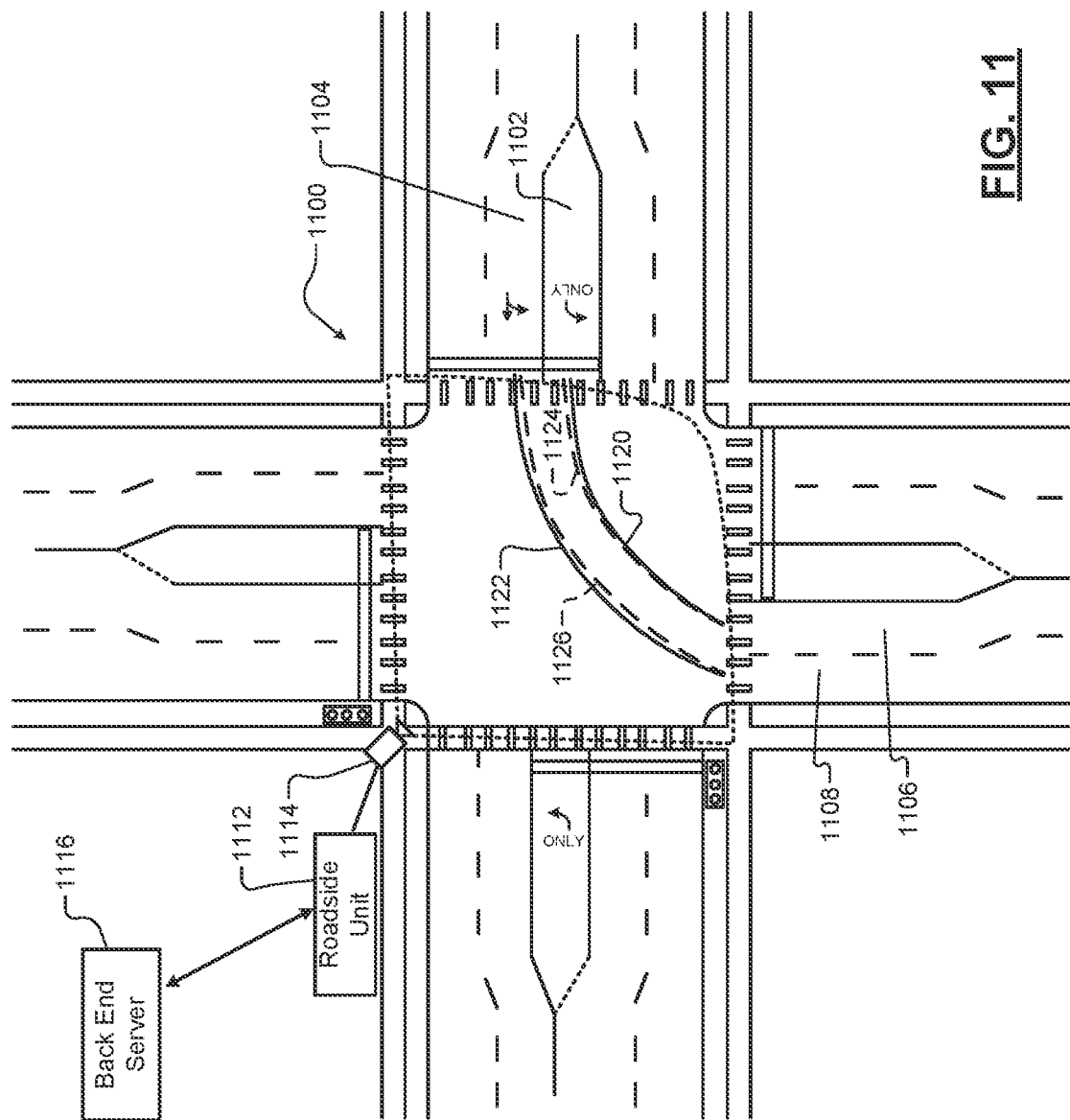
FIG. 11 is a top view of an example intersection illustrating similar example static and dynamic paths of vehicles from two turning lanes to two egress lanes through the intersection in accordance with the present disclosure.

FIG. 11 shows an intersection 1100 illustrating similar static and dynamic paths of vehicles from two turning lanes 1102, 1104 to two egress lanes 1106, 1108 through the intersection. A RSU 1112, which is connected to a camera 1114 and a backend server 1116, monitors movement of vehicles through the intersection 1100. The static paths are solid lines 1120, 1122 and the dynamic paths are dashed lines 1124, 1126. The RSU 1112 may determine the static paths 1120, 1122 and the dynamic paths 1124, 1126 and broadcast this information to the vehicles. The static paths and/or the dynamic paths may not be circular and/or entirely curved, but rather may include curved, linear and/or semi-linear segments. The segments are in series and each of the paths is provided by a respective serial set of segments. The static paths and/or the dynamic paths may include points where linear, semi-linear, and/or curved segments meet. The dynamic paths may fully match, partially match, be similar in shape, or be different than the corresponding static paths.

Figure 12:
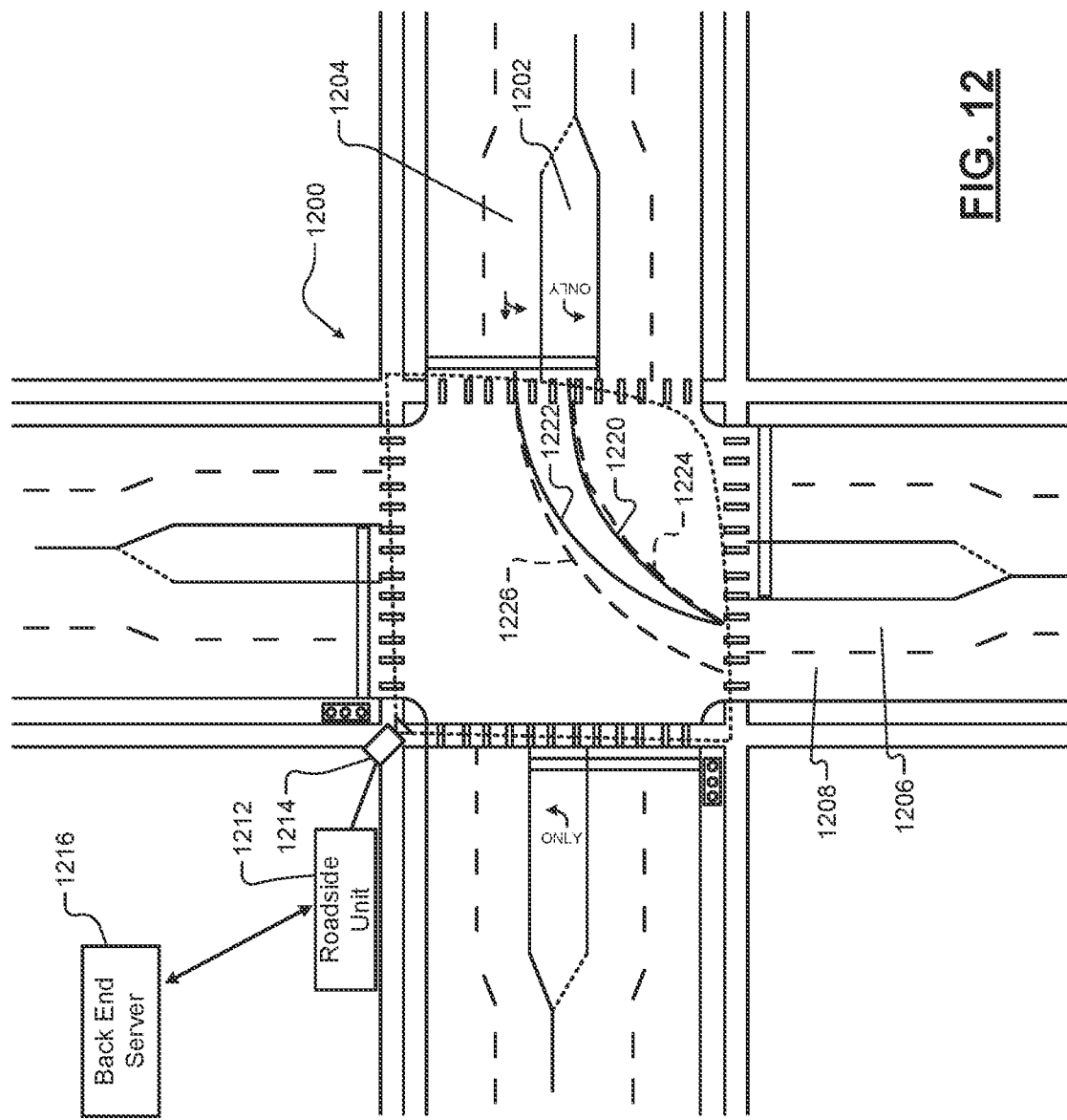
FIG. 12 is a top view of an example intersection illustrating different example static and dynamic paths of vehicles from two turning lanes to two egress lanes through the intersection in accordance with the present disclosure.

FIG. 12 shows an example, where a dynamic path is substantially different than a static path due to use of a different egress lane. FIG. 12 shows an intersection 1200 illustrating different static and dynamic paths of vehicles from two turning lanes 1202, 1204 to two egress lanes 1206, 1208 through the intersection 1200. A RSU 1212, which is connected to a camera 1214 and a backend server 1216, monitors movement of vehicles through the intersection 1200. The dynamic paths are solid lines 1220, 1222 and the static paths are dashed lines 1224, 1226. The RSU 1212 may determine the dynamic paths 1220, 1222 and the static paths 1224, 1226 and broadcast this information to the vehicles.

Figure 13:
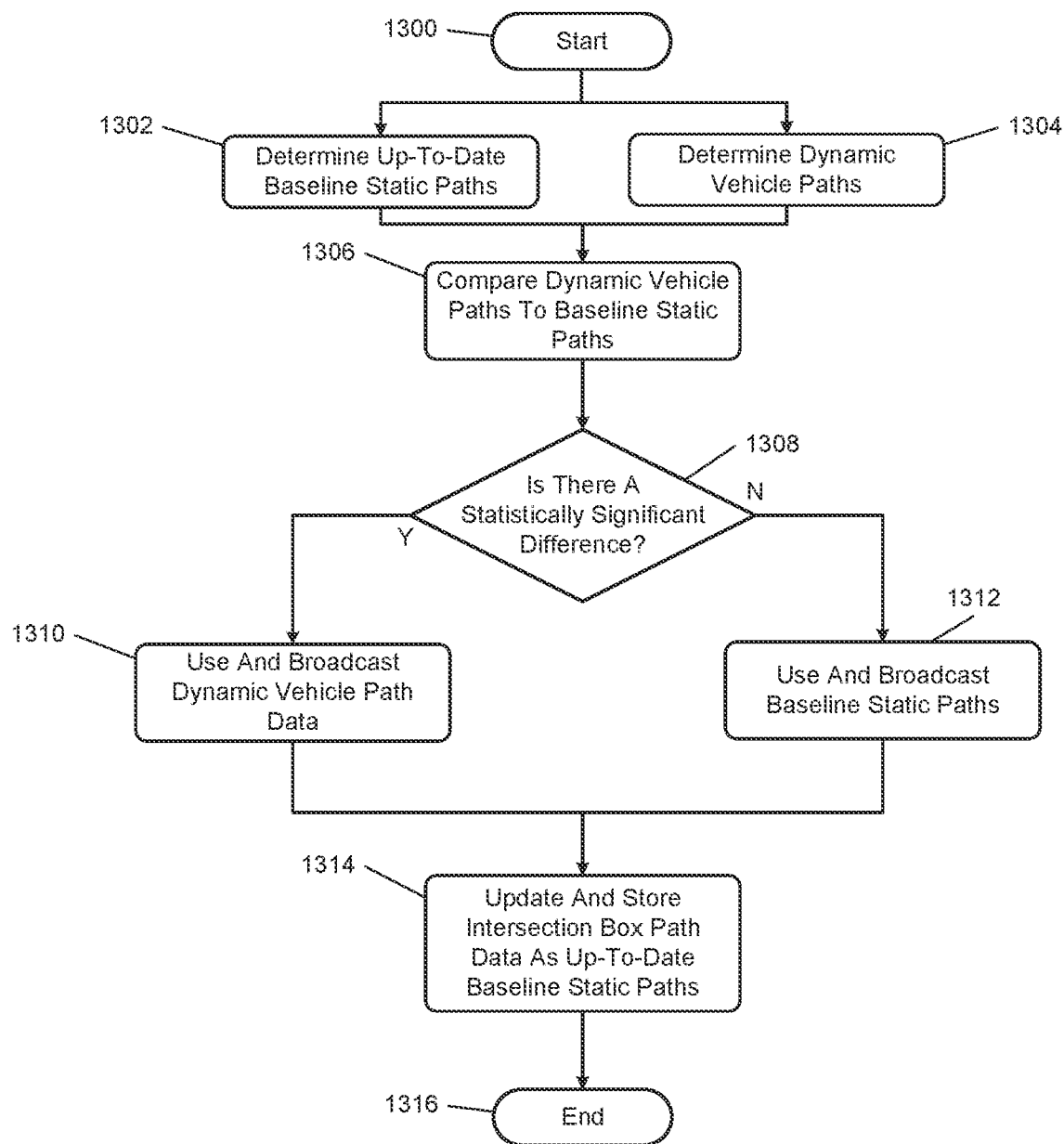
FIG. 13 illustrates an example method of determining whether to broadcast static paths or dynamic paths in accordance with the present disclosure.

FIG. 13 shows a method of determining whether to broadcast static paths or dynamic paths. The operations of FIG. 13 may be iteratively performed. The method may start at 1300. At 1302, a control module of, for example, a RSU may determine baseline static paths of vehicles through an intersection. This may include historical static path information of averaged paths of vehicles that previously moved through the intersection.

At 1304, the control module may determine dynamic paths of vehicles currently moving through the intersection. The dynamic paths may be generated based on tracked vehicle movement through the intersection using (i) captured images from a camera system, (ii) other intersection sensor data, and/or (iii) location data included in received BSMs broadcast from the vehicles in the intersection. The control module may average trajectories of different vehicles to create a set of nodes and/or calculate turn radii of the trajectories and average the turn radii. Window duration and frequency of trajectory averaging may be configurable parameters that are remotely adjusted by, for example, a backend server.

At 1306, the control module may compare the dynamic paths and/or an average thereof to the baseline static paths to determine differences between the baseline static and dynamic paths. Intersection box path data may be generated based on this comparison, which may be broadcast as part of a V2X map message to nearby vehicles. The intersection box path data may include the dynamic vehicle path data provided at 1310 or the baseline static vehicle path data provided at 1312.

At 1308, the control module may determine whether there is a statistically significant difference between the baseline static paths and the dynamic paths. One or more different statistically significant difference algorithms and/or methods may be used to determine whether a statistically significant difference exists. For example, the control module may determine whether there is a statistical significance between the dynamic paths and the baseline static paths when a difference between the dynamic paths and the baseline static paths is greater than a predetermined amount. As another example, the control module may determine there is a statistical significance between the dynamic paths and the baseline static paths when at least a portion of the dynamic paths deviates from the baseline static paths by more than a predetermined amount.

As yet another example, the control module may determine there is a statistical significance between the dynamic paths and the baseline static paths when an average difference between nodes of one of the dynamic paths and nodes of one of the baseline static paths exceeds a predetermined amount. As yet another example, the control module may determine there is a statistical significance between the dynamic paths and the baseline static paths when a predetermined percentage of differences between nodes of one of the dynamic paths and nodes of one of the baseline static paths is greater than a predetermined percentage (e.g., 10%).

The control module may be configured to adjust a window duration for tracking the vehicles to determine the dynamic paths. The control module may be configured to adjust a frequency at which trajectories of the vehicles are averaged to determine (i) an averaged dynamic path, and/or (ii) when a difference exists between the averaged dynamic path and a static path. The more the dynamic paths diverge from the static paths, the more likely there is a statistically significant difference.

Operation 1310 may be performed when there is a statistically significant difference, otherwise operation 1312 may be performed.

At 1310, the control module may use and broadcast the dynamic path data. The dynamic path data may be used to estimate and predict locations of vehicles. The estimated and predicted locations may be broadcasted to the vehicles along with or as an alternative to the dynamic path data.

At 1312, the control module may use and broadcast the baseline static path data. The static path data may be used to estimate and predict locations of vehicles. The estimated and predicted locations may be broadcast to the vehicles along with or as an alternative to the baseline static path data.

If operation 1310 is performed, then the baseline static path data may need updating. Operation 1314 may be performed subsequent to operation 1310 to update the baseline static path data based on the dynamic path data. The control module may replace the baseline static path data with the dynamic path data or average the baseline static path data with the dynamic path data. The dynamic path data may be averaged with an average of baseline static path data or with a last predetermined window of static path data. The method may end at 1316.

Certain intersections may only have baseline static path information and not dynamic path information. Other intersections may have both baseline static path information and dynamic path information.

Map Message Generation

Figure 14:
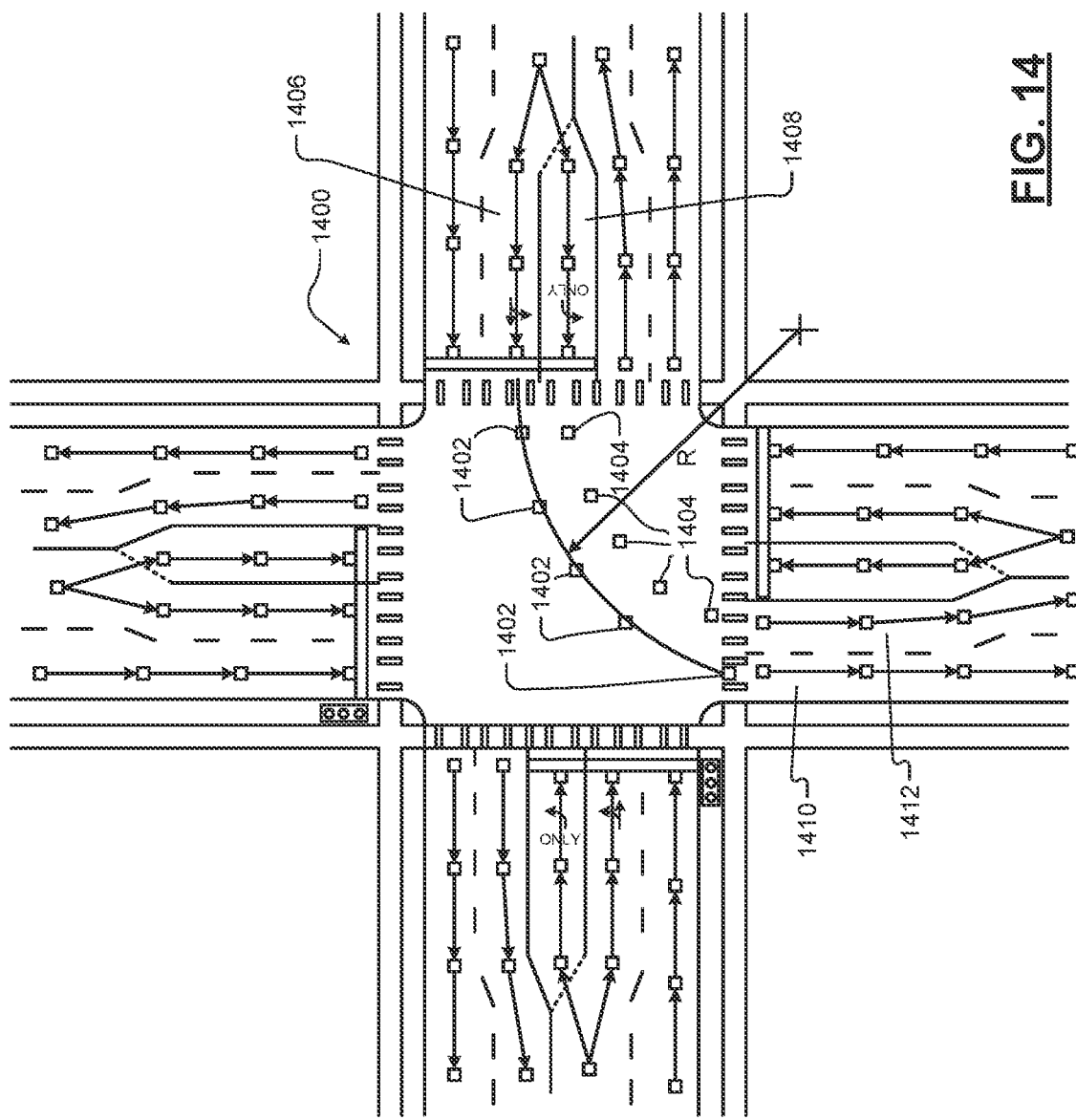
FIG. 14 is a top view of an example intersection illustrating example nodal points of paths of vehicles from two turning lanes to two egress lanes through the intersection including an example radius of curvature in accordance with the present disclosure.
Figure 15:
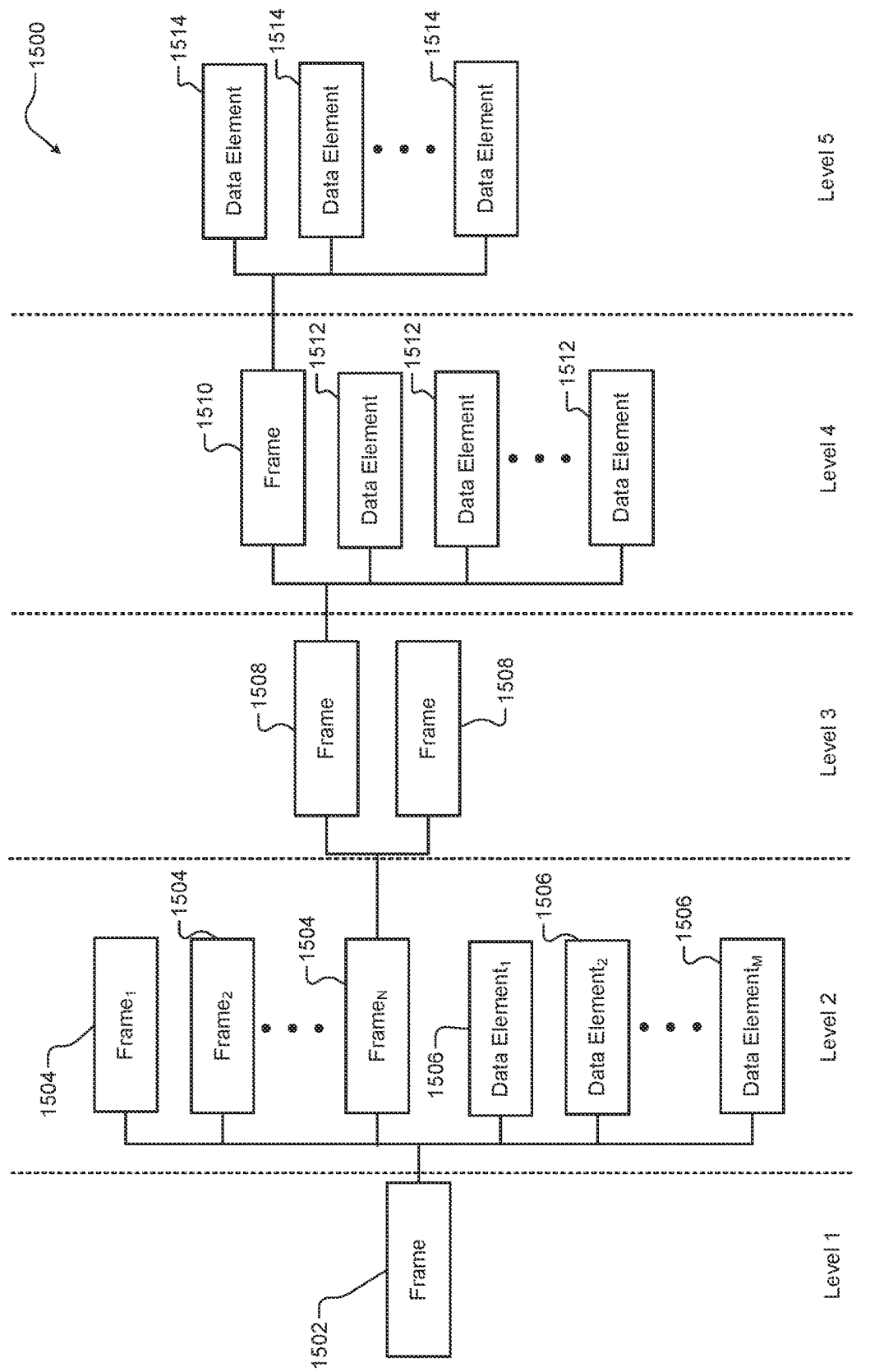
FIG. 15 is a block diagram of an example representation of a tree structure of a map message in accordance with the present disclosure.
Figure 16:
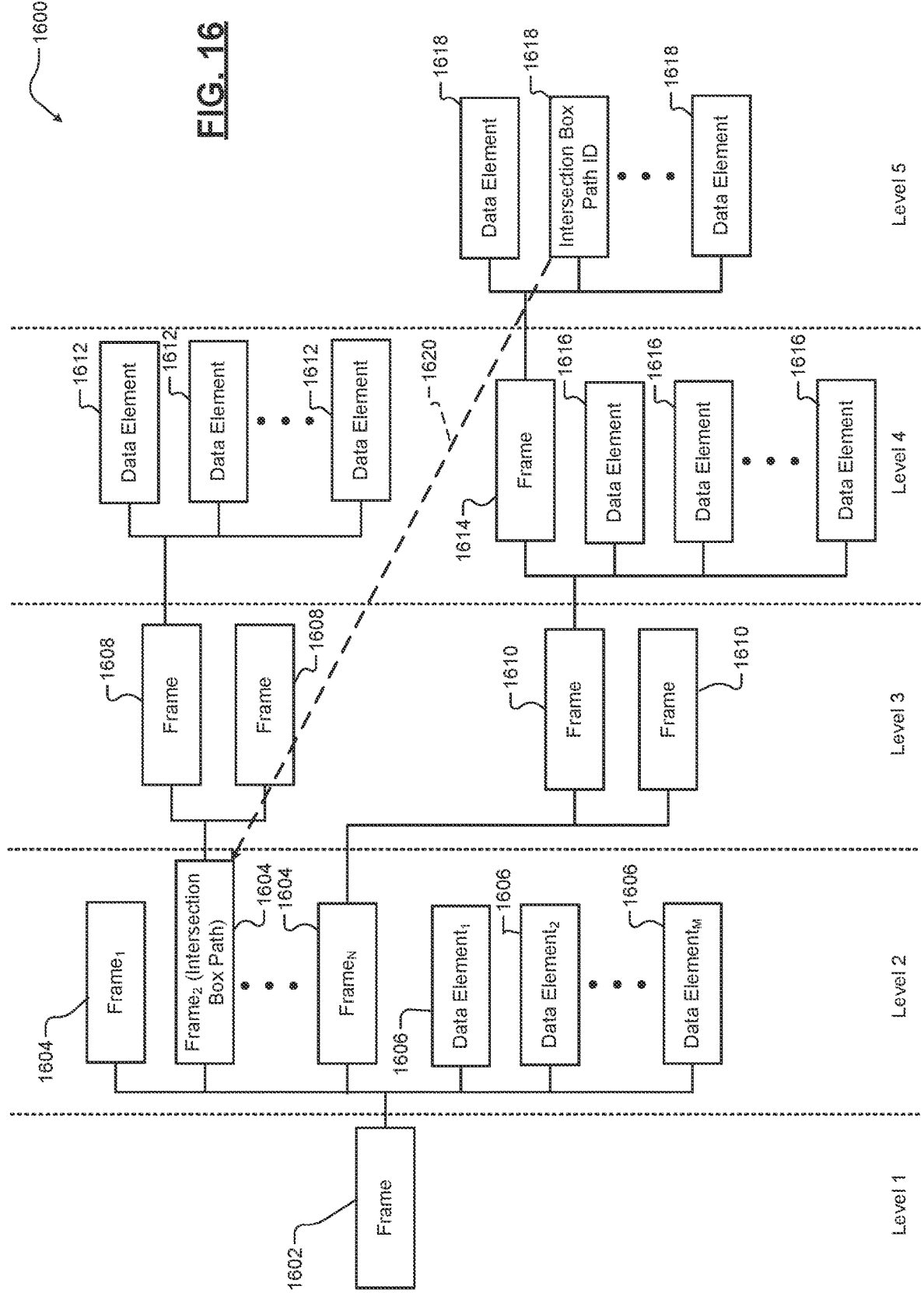
FIG. 16 is a block diagram of an example representation of a tree structure of a map message including a level jumper in the form of an intersection box path frame identifier in accordance with the present disclosure.

The following FIGS. 14-16 are directed to generation and usage of map messages including valid intersection path information in addition to other information traditionally included in a map message. Valid intersection path information may include available and permissible path information. Examples of traditional map message content is referred to below. This may include updating static path data using information defining planned lane closures and other road obstructions.

FIG. 14 shows an intersection 1400 illustrating nodal points 1402, 1404 of paths of vehicles from two turning lanes 1406, 1408 to two egress lanes 1410, 1412 through the intersection 1400 including an example radius R of curvature. A control module of a RSU may use road geometry information to determine available turning paths through the intersection 1400. The turning paths may be determined based on stored locations of vehicles in the intersection moving from the ingress lanes 1406, 1408 to the egress lanes 1410, 1412. The paths may be generated based on nodal points and/or radii of curvature of lines (or paths) connecting the nodal points. The control module may average trajectories of the vehicles to create a set of nodes or a turning radius to determine each of the dynamic paths. The control module is configured to adjust a window duration for tracking the vehicles to determine the dynamic paths. The nodal points and/or the radii may be included in a map message, which is broadcasted and/or transmitted from the RSU or other station to the vehicles and/or VRU devices. The map message may include intersection box path data indicating locations of the vehicles in the intersection. The map message may be a V2X type map message.

FIG. 15 shows a representation of a tree structure of a map message 1500. The tree structure includes levels, where each level includes one or more data elements and/or one or more frames. Each frame is connected to a next level, which includes one or more data elements and/or one or more frames.

In the example shown, the map message 1500 includes 5 levels of information, but may include any number of levels of information. The first level includes a frame 1502, which refers to frames 1504 and data elements 1506 in a second level. Although not shown, each of the frames 1504 refers to one or more data elements and/or one or more frames. As shown, one of the frames 1504 (referred to as a "connects to" frame) may refer to additional frames 1508 in a next level. The connects to frame may include information about ingress and egress lanes and corresponding attributes of each lane, such as certain types of traffic signals. One of the frames 1508 may refer to a frame 1510 and data elements 1512. The frame 1510 may refer to data elements 1514.

As an example, the frame 1502 may be a generic frame. The frames 1504 may include a lane attributes frame, a maneuvers frame, a node list frame, a connected to frame, an overlays frame, and/or a regional frame. The data elements 1506 may include a lane identifier, a name, an ingress and approach identifier, and/or an egress and approach identifier. The connects to frame may refer to the frames 1508, which may be referred to as "connection" frames. The data elements 1512 may include a connecting lane data element, a remote intersection data element, a signal group data element, a user class data element, and/or a connection identifier.

The frame 1510 may be an intersection box path frame that refers to intersection path information, such as a radius of a vehicle path, a center point latitude, a center point longitude, and a node list. The center point latitude and center point longitude refer to coordinates of a center point of a circle having the radius of a vehicle path. The intersection box path information is added to the map message to indicate vehicle locations within the corresponding intersection, which may be used by vehicles to determine locations of the vehicles and for other purposes as further described below.

As an alternative option to that of FIG. 15, FIG. 16 shows a representation of a tree structure of a map message 1600 including a level jumper (or link between levels) in the form of an intersection box path frame identifier (ID). The tree structure includes levels, where each level includes one or more data elements and/or one or more frames. Each frame is connected to a next level, which includes one or more data elements and/or one or more frames.

In the example shown, the map message 1600 includes 5 levels of information, but may include any number of levels of information. The first level includes a frame 1602, which refers to frames 1604 and data elements 1606 in a second level. Although not shown, each of the frames 1604 refers to one or more data elements and/or one or more frames. As shown, one of the frames 1604 may refer to additional frames 1608 and another one of the frames 1604 may refer to frames 1610 in a next level. The one of the frames 1608 may refer to data elements 1612 in level 4. The frames 1608 may be referred to as "connection" or "path" frames. The frames 1610 may be referred to as "connection" frames.

One of the frames 1610 may refer to a frame 1614 and data elements 1616. The frame 1614 refs to data elements 1618. One of the data elements 1618 is a level jumper that jumps from level 5 to level 2 and from one of the data elements 1618 (referred to as the "intersection box path identifier") to the one of the frames 1604 (referred to as the "intersection box path frame"). The jump is shown by dashed arrow 1620. The data elements 1612 may include intersection path information, such as the intersection box path ID, a radius of a vehicle path, a center point latitude, a center point longitude, and a node list. The center point latitude and center point longitude refer to coordinates of a center point of a circle having the radius of a vehicle path. The intersection box path information is added to the map message to indicate vehicle locations within the corresponding intersection, which may be used by vehicles to determine the locations of the vehicles and for other purposes as further described below.

The tree structures of the map messages 1500, 1600 of FIGS. 15-16 may be used to quickly access the intersection box path information while traversing a minimum number of levels and while accessing and/or referring to a minimum number of frames and data elements. The map messages 1500, 1600 may indicate, for each ingress lane of an intersection, which egress lanes are available for a vehicle that is in that ingress lane. The map messages 1500, 1600 may indicate which traffic signal applies to that vehicle while in the ingress lane. For example, whether a left turn traffic signal light, a right turn traffic signal light, or a straight through traffic signal light applies to that ingress lane.

The map messages 1500, 1600 may be generated by a remote station and broadcasted and/or transmitted to vehicles. The vehicles may then use the map and/or intersection box path information to determine locations of the vehicles, where the vehicles are located in a lane, which lanes the vehicles are in, etc. This information may then be used to determine if one or more of the vehicles is about to, for example, run a red light, collide into another vehicle, follow an invalid path through the intersection, or perform some other improper maneuver. A control module of the corresponding vehicle may detect that a vehicle is about to run a red light based on: time until the light is to change from red to green; vehicle location; vehicle speed; and vehicle heading information.

Path Prediction Enhancement

Figure 17:
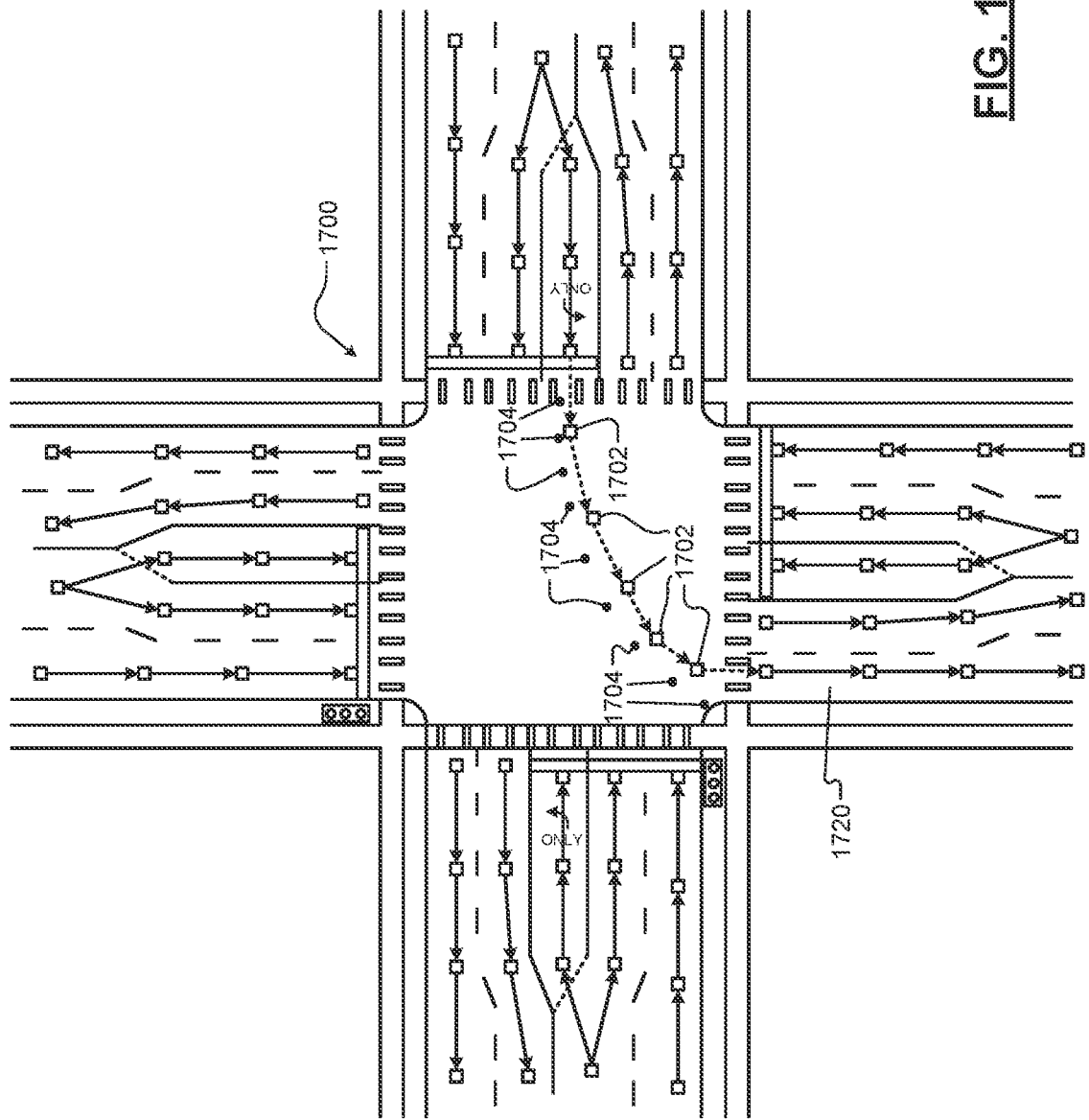
FIG. 17 is a top view of an example intersection illustrating example predicted first nodal points of vehicles determined based on available intersection path information of a map message and example predicted second nodal points of vehicles determined without intersection path information provided via a map message in accordance with the present disclosure.
Figure 18:
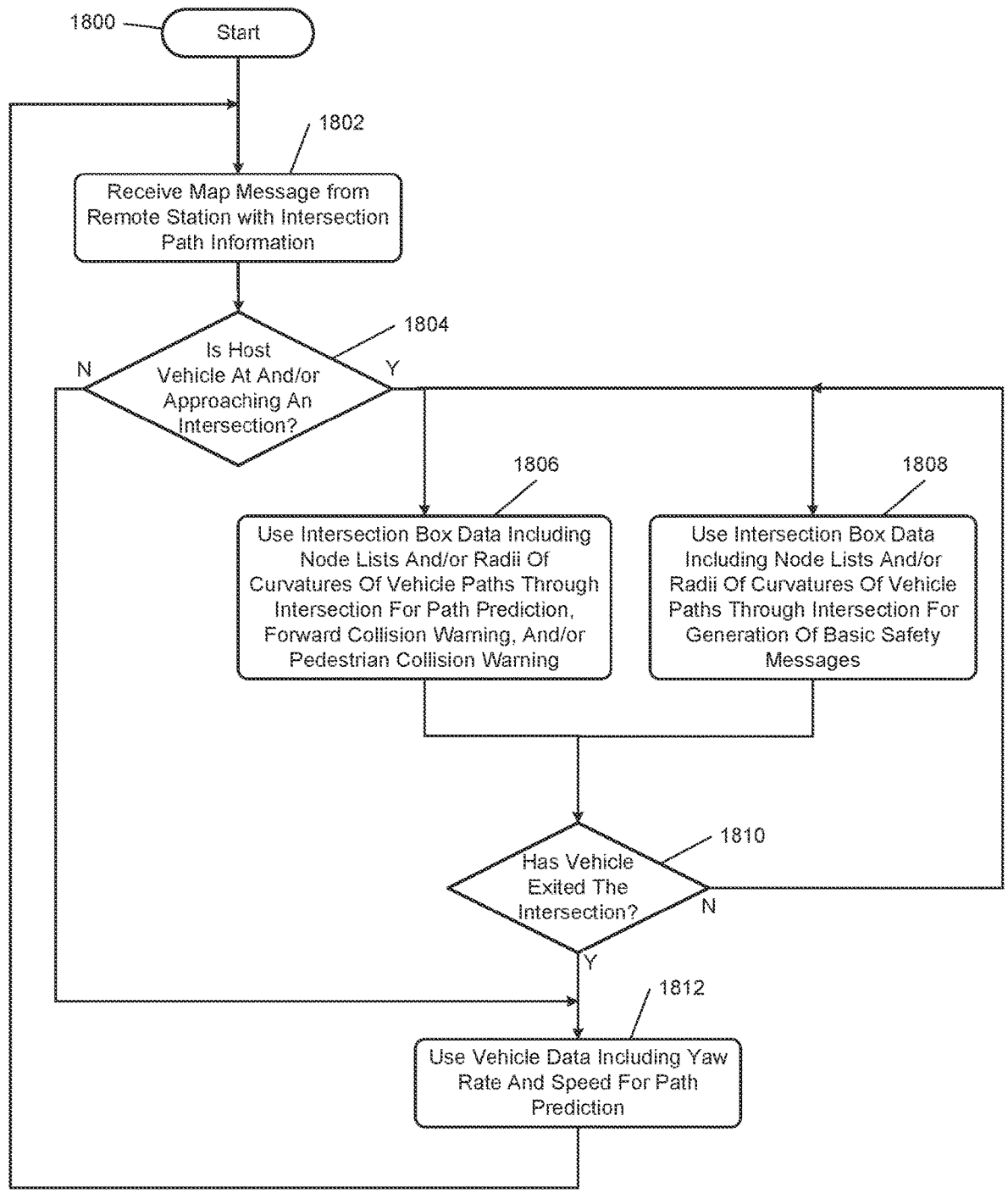
FIG. 18 illustrates a method of providing intersection-based path prediction and providing collision warning and basic safety message transmission based on the path prediction in accordance with the present disclosure.

The following FIGS. 17-18 are directed to an improved path prediction algorithm that utilizes valid intersection path information when appropriate and under certain conditions. This may include generation of dynamic vehicle path data of vehicles passing through an intersection using images captured by an intersection camera (and/or other sensor data) and/or basic safety messages generated by connected vehicles as described above. The prerequisites to enhanced path prediction are reception of a map message and presence of an intersection including available paths therethrough.

FIG. 17 shows a top view of an example intersection 1700 illustrating predicted first nodal points 1702 of vehicles based on available intersection path information of a map message and predicted second nodal points 1704 of vehicles without intersection path information provided via a map message.

A path prediction algorithm without intersection path information may require yaw rate, vehicle speed and global navigation satellite system (GNSS) inputs for predicting paths of vehicles. Yaw rates and speeds of vehicles are typically not constant, this is especially true while the vehicles are turning or if they are moving after a stop. For this reason, path prediction based on yaw rate, vehicle speed and GNSS data can be inaccurate, especially while making sharp turns and/or moving from a stand still position. As disclosed herein, static and dynamic path information may be provided in map messages to improve path predictions. The path predictions may be based on the static and/or dynamic path information and/or based on yaw rate, vehicle speed and GNSS data. The static and dynamic path information are high probability indicators of vehicle paths and thus may be weighted more heavily than yaw rate, vehicle speed and GNSS data when weighting parameters based on which vehicle paths are predicted. In the example of FIG. 17, the second nodal (or path prediction) points 1704, due to prediction inaccuracies associated with using yaw rate, vehicle speed and GNSS data, result in a predicted path that is not directed at egress lane 1720. This is unlike the first nodal (or path) points 1702 that lead to the egress lane 1720.

In an embodiment, a control module of a vehicle, instead of relying on yaw rate and vehicle speed, uses map message data for path prediction operations when GNSS position data indicates that the vehicle is traveling along a node path indicated by the map message. With regards to path prediction, CAN data, which may include yaw rate data and vehicle speed data may be ignored when approaching an intersection and activated and/or relied upon after leaving the intersection.

FIG. 18 a method of providing intersection-based path prediction and providing collision warning and basic safety message transmission based on the path prediction. The operations of FIG. 18 may be iteratively performed. The method may begin at 1800. At 1802, a control module of a vehicle (e.g., one of the control modules 120, 220, 307 of FIGS. 1-3) may be used to receive a map message from a remote station, such as any of the remote stations referred to herein including the cloud-based server 108, the RSUs 110, the RSU 202, the remote station 400 of FIGS. 1-4.

At 1804, the control module may determine whether the host vehicle is at and/or approaching an intersection. If yes, operations 1806, 1808 are performed, otherwise operation 1812 is performed. In one embodiment, operations 1806 and 1808 are performed sequentially such that one of operations 1806, 1808 is performed prior to the other one of operations 1806, 1808. At 1806, the control module uses intersection box data including node lists and/or radii of curvatures of vehicle paths through the intersection for path prediction and/or collision warning.

The locations of the host vehicle may be determined based on other information, such as vehicle speed, yaw rate of the vehicle, GNSS (or GPS) data, etc. Use of the map message information including the node lists and/or the radii of curvatures of the vehicle paths provides a fundamentally better prediction of the path of the host vehicle than if speed and yaw rate of the host vehicle were used alone for path prediction purposes. The control module may receive GNSS data and determine when the host vehicle is at or close to a node of a static or dynamic nodal set of the map message. As an example, the GNSS location is likely correct and the host vehicle may not be in a center of a path. The correlation to the nodes indicates the host vehicle is traveling on a similar path.

Predicted path information and/or nodal positions on the static or dynamic paths are broadcast over air in basic safety messages to other vehicles to prevent collisions. Path data may be sent in map messages to other vehicles to prevent collisions. The collision warning may include forward collision warning, pedestrian collision warning, and/or other collision warning (e.g., side collision warning). The collision warning operations are performed based on a predicted path of the host vehicle as determined by the control module.

At 1808, the control module uses intersection box data including node lists and/or radii of curvatures of vehicle paths through the intersection for generation of BSMs. The control module determines the most likely path of the host vehicle based on the node lists and/or the radii of curvature and generates the BSMs indicating the predicted path of the host vehicle. This determination may also be based on other information, such as vehicle speed, yaw rate of the vehicle, GNSS (or GPS) data, etc. The BSMs may be transmitted from the host vehicle to (i) nearby connected vehicles and (ii) VRU devices to indicate the predicted path of the host vehicle and support collision avoidance applications.

At 1810, the control module determines whether the host vehicle has exited the intersection. If yes, operation 1812 may be performed, otherwise operations 1806, 1808 may be repeated. At 1812, the control module uses vehicle data, which may be CAN data, including yaw rate and speed of the vehicle for path prediction purposes. This may not include using node lists and/or radii of curvature from map messages. Operation 1802 may be performed after operation 1812.

Pedestrian Collision Warning Enhancement

Figure 19:
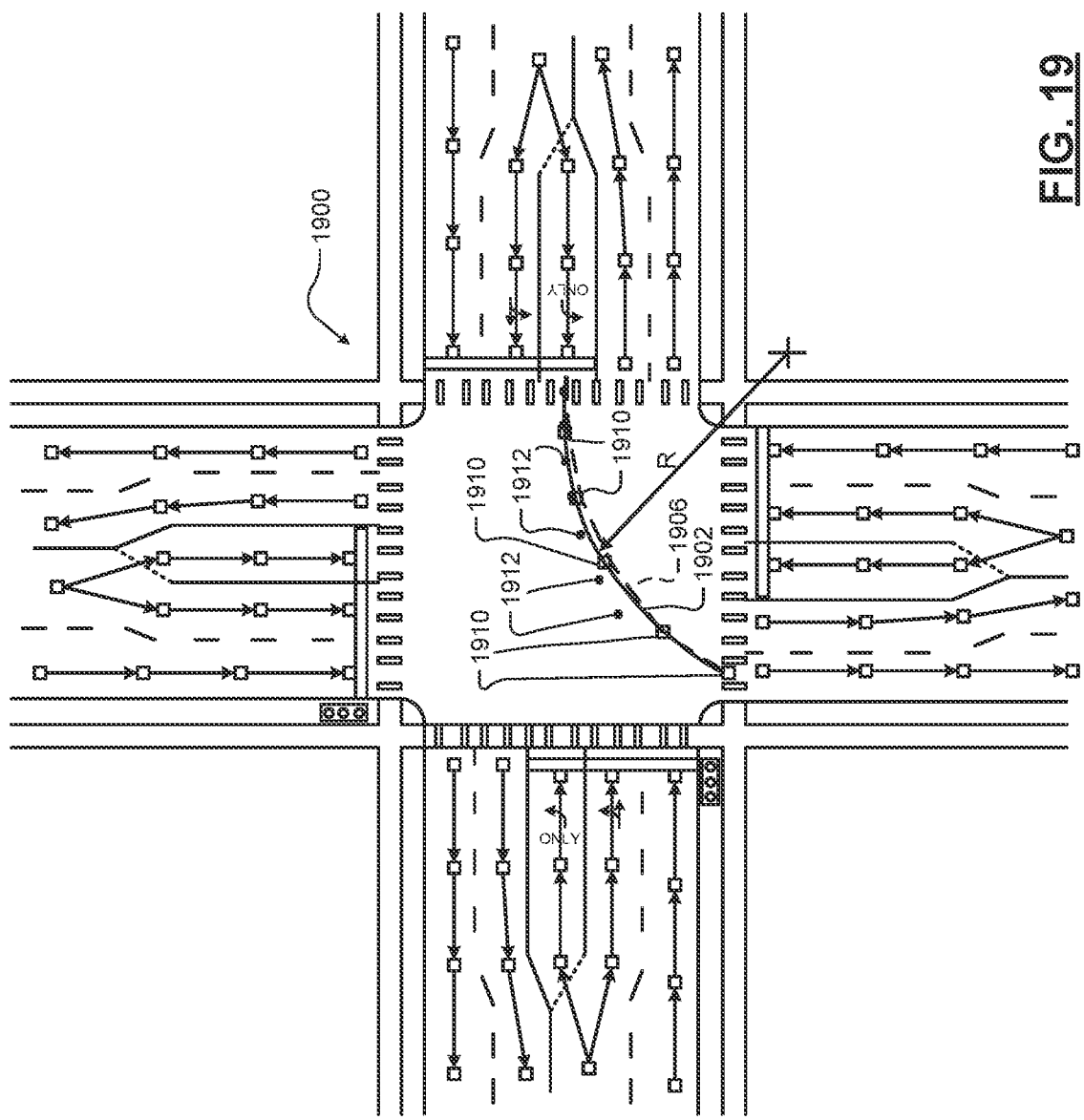
FIG. 19 is a top view of an example intersection illustrating an example first predicted path based on map message intersection path information provided via a map message, an example second predicted path based on vehicle speed and yaw rate, an example actual vehicle path, and an example corresponding radius of curvature in accordance with the present disclosure.
Figure 20:
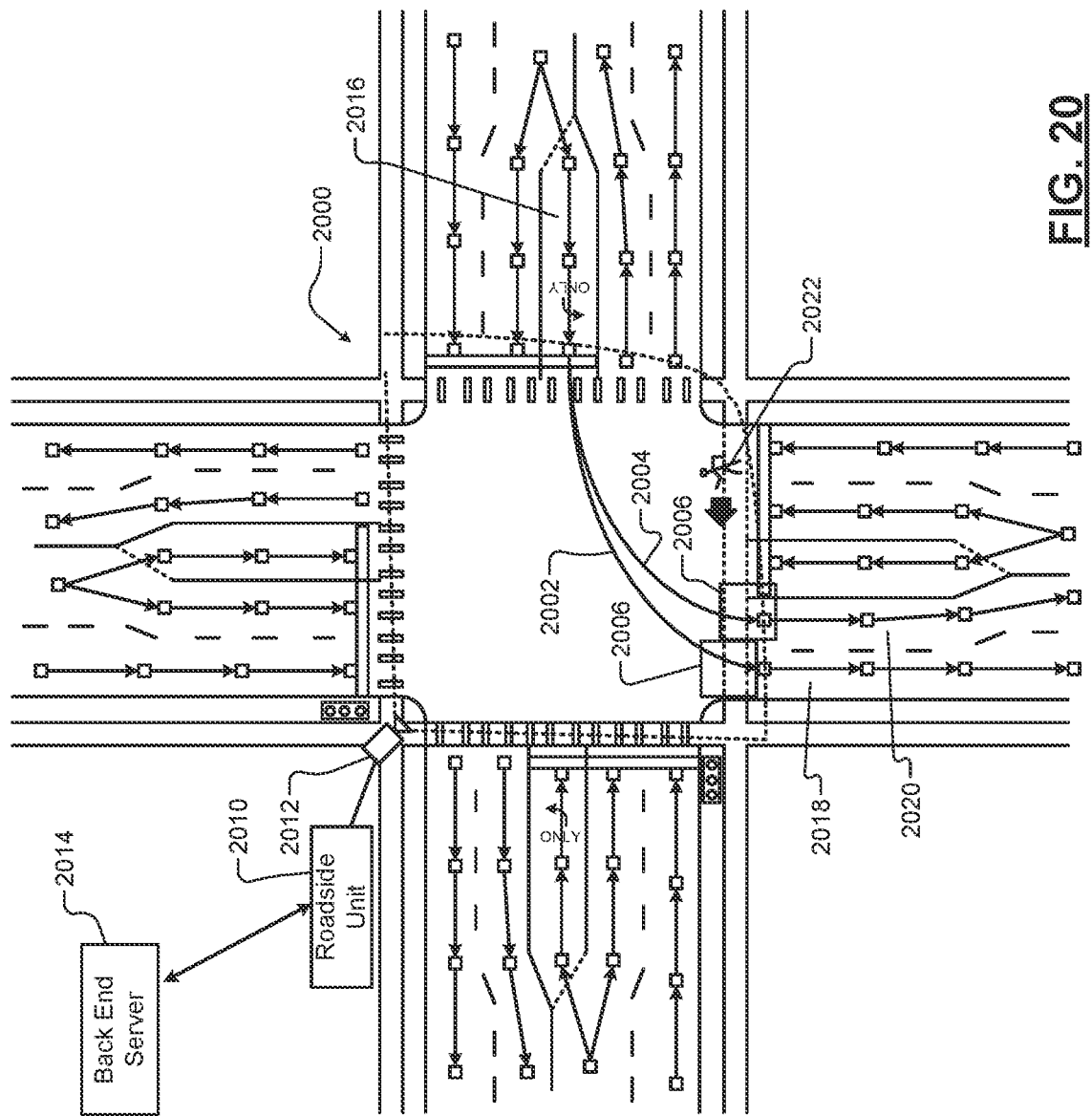
FIG. 20 is a top view of an example intersection illustrating a predicted paths of vehicles and conflict boxes in accordance with the present disclosure.
Figure 21:
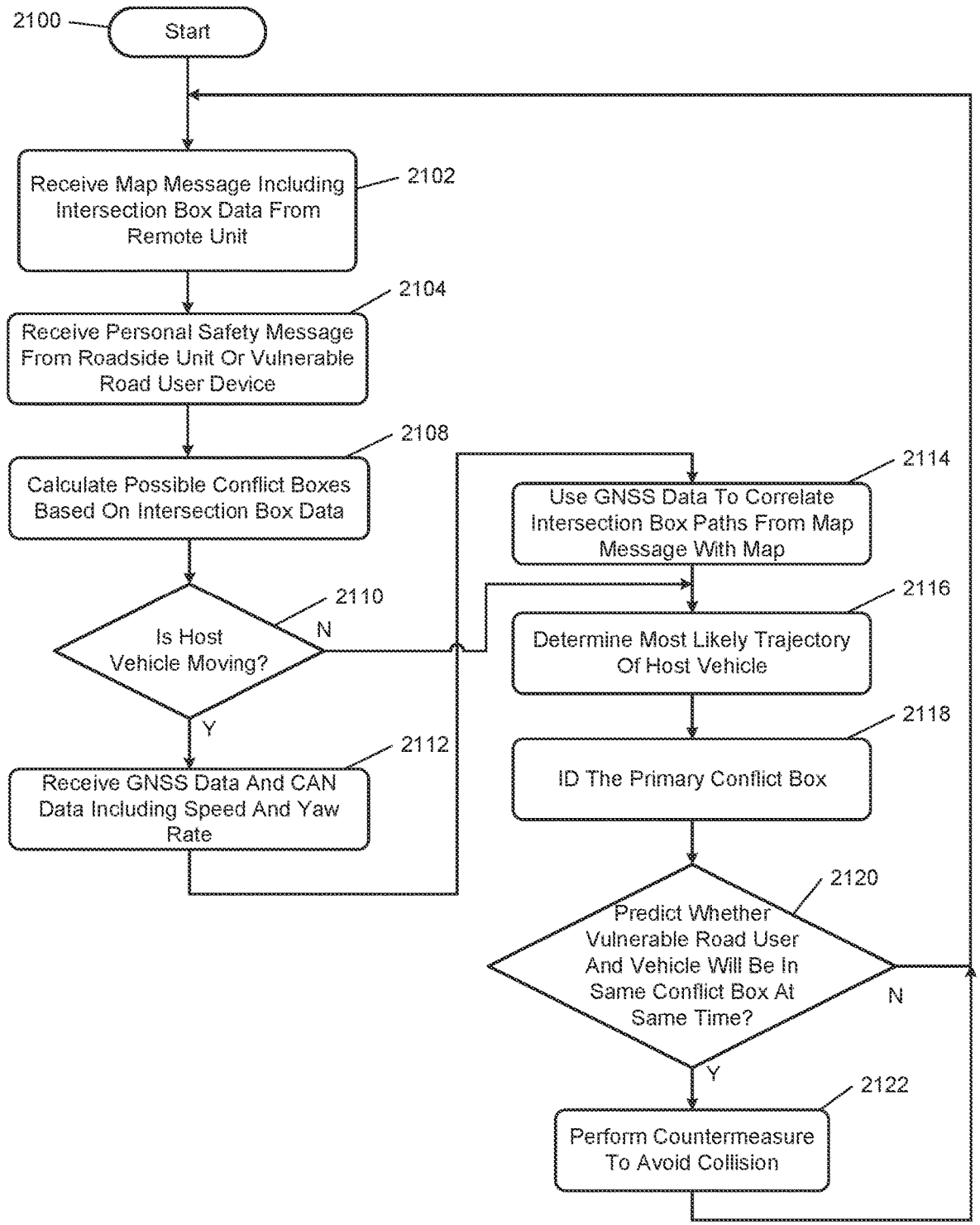
FIG. 21 illustrates an example method of performing pedestrian collision warning based on intersection path information of map messages in accordance with the present disclosure.

The following FIGS. 19-21 are directed to PCW enhancement using the path predictions provided as described above. This provides more accurate detection and avoidance of VRU collision threats.

FIG. 19 shows an intersection 1900 illustrating a first predicted path 1902 based on map message intersection path information, a second predicted path based on vehicle speed and yaw rate, a third actual vehicle path 1906 and an example corresponding radius R of curvature. The first predicted path 1902 has node points 1910. The second node path has corresponding points 1912.

When the host vehicle starts from a dead stop, for example while in a left turn lane prior to making a left turn, the speed and yaw rate accuracy is not sufficient to accurately predict the path of the host vehicle through the intersection. Use of map message information including nodal lists and/or radii of curvature of vehicle paths through the intersection provides a high probability path that the host vehicle will follow, such as the path 1902. This high probability path may be used when predicting the path of the host vehicle. Should vehicle speed and yaw rate be used alone, the control module of the host vehicle may predict the host vehicle following the second path illustrated by points 1912. The radii may be provided when paths are circular, semi-circular and/or arc shaped. Use of the map message information including an intersection data set including the nodal lists and/or radii improves accuracy of path predictions. The path predictions are able to be more quickly made and used for collision warning purposes, such as for determining pedestrian conflict boxes. Pedestrian conflict boxes refer to areas when a host vehicle and a pedestrian may be located at the same moment in time. Some example pedestrian conflict boxes are shown in FIG. 20.

FIG. 20 shows an intersection 2000 illustrating predicted paths 2002, 2004 of vehicles and conflict boxes 2006. The intersection may include a RSU 2010 connected to a camera 2012 and a backend server 2014. In the example, shown vehicles may move through the intersection 2000 from a left turn lane 2016 to an egress lane 2018 along the path 2002 or from the left turn lane 2016 to an egress lane 2020 along the path 2004. The conflict boxes 2006 may be referred to as pedestrian conflict boxes. The conflict boxes 2006 refer to areas within which a vehicle and a pedestrian (e.g., the pedestrian 2022) may be located at the same time and thus where a potential collision may occur.

FIG. 21 shows a method of performing pedestrian collision warning at a vehicle based on intersection path information of map messages received at the vehicle. The following operations may be iteratively performed. The method may begin at 2100. At 2102, a control module of the vehicle may receive a map message including intersection box data from a remote station (e.g., the RSU 2010 of FIG. 20).

At 2104, the control module may receive a personal safety message (PSM) from the RSU or VRU device. The PSM may indicate kinematic state of the VRU when the VRU device is carried by the VRU. This may include speed, location and/or heading of the VRU. As an example, the VRU device may be a portable device held or worn by a pedestrian walking across a crosswalk of the intersection, as shown in FIG. 20. Example portable devices are mobile phones, laptop computers, tablets, smart watches, etc. The RSU may receive a PSM from the VRU device and relay the PSM to the RSU. PSMs may also be generated by the RSU with detection of VRU done by the camera or other sensing device connected to the RSU.

At 2108, the control module may calculate possible conflict boxes (e.g., the conflict boxes 2006 of FIG. 20) based on intersection box data. It can be difficult to measure speed and yaw rate when the vehicle is stopped and/or is starting to move and can take time to stabilize and thus it can be difficult to determine the locations of the vehicle and predict conflict boxes based solely on the vehicle speed and yaw rate.

At 2110, the control module may determine whether the vehicle is moving. If yes, operation 2112 is performed, otherwise operation 2016 is performed. At 2112, the control module may receive GNSS (or GPS) data and CAN data including speed and yaw rate of the vehicle.

At 2114, the control module may use the GNSS data to correlate intersection box paths from map message with a map of the area. At 2116, the control module may determine a most likely trajectory of the vehicle based on the correlation results. At 2118, the control module may identify a primary conflict box of the possible conflict boxes. This is based on the data collected and/or calculated. The primary conflict box is the conflict box with the highest likelihood in which of a collision is to occur. This is based on the known speeds, locations, headings, and/or predicted trajectories of the vehicle and the VRU and VRU device.

At 2120, the control module may predict whether the VRU and the vehicle will be in the same conflict box (i.e., in the same geographical area at a same time). If yes, operation 2122 may be performed, otherwise operation 2102 may be performed.

At 2122, the control module may perform a countermeasure to avoid a collision. This may include generating alert messages within and/or external to the vehicle. The control module may control operation of the vehicle to adjust the speed, acceleration and/or deceleration of the vehicle to avoid a collision. The control module may send a signal to the VRU device such that the VRU device can perform a countermeasure including warning the VRU. The VRU may then take action to avoid a collision.

The above-described operations of FIGS. 8, 13, 18 and 21 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Although various different features and embodiments are described above with respect to FIGS. 1-21, any or all of the embodiments of FIGS. 1-21 may be combined and implemented as a single embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A path prediction system comprising:
a transceiver configured to receive a map message at a host vehicle, the map message comprising path information of vehicles through an intersection;
a memory configured to store map data including global navigation satellite system information; and
a control module configured to (i) based on the map data, determine if the host vehicle is within a predetermined distance of the intersection, at an entry point of the intersection, or within the intersection, (ii) in response to determining that the host vehicle is approaching within the predetermined distance of the intersection, at the entry point of the intersection, or within the intersection, predict a path of the host vehicle through the intersection based on the path information, (iii) predict the path of the host vehicle through the intersection based on at least one of a node list or a radius of curvature of a previous path of either the host vehicle or another vehicle, the node list being a list of point locations of either the host vehicle or the another vehicle along the previous path, and iv) autonomously drive the host vehicle based on the predicted path of the host vehicle through the intersection,
wherein the control module is configured to at least one of
i) determine whether the map data includes at least one of a node list or a radius of curvature of each of a plurality of vehicle paths through the intersection, and, in response to the map data not including the at least one of the node list or the radius of curvature of each of the plurality of vehicle paths through the intersection, predict the path of the host vehicle based on at least one of speed or yaw rate of the host vehicle, and
ii) determine whether the host vehicle has left the intersection, and (ii) in response to the host vehicle having left the intersection, transition from predicting the path of the host vehicle based on the map data to predicting the path of the host vehicle based on at least one of speed or yaw rate of the host vehicle.

2. The path prediction system of claim 1, wherein:
the control module is configured to predict the path of the host vehicle based on the node list and the radius of curvature of the previous path of the host vehicle or the another vehicle through the intersection along with a latitude and longitude of a center point of the radius of curvature; and
the map message includes the node list and the radius of curvature of the previous path of the host vehicle or the another vehicle through the intersection.

3. The path prediction system of claim 2, wherein the control module is configured to predict the path independent of speed of the host vehicle and yaw rate of the host vehicle.

4. The path prediction system of claim 1, wherein the control module is configured to (i) obtain at least one of a vehicle speed or a yaw rate of the host vehicle in the intersection, and (ii) predict the path of the host vehicle based on the at least one of the vehicle speed or yaw rate of the host vehicle in the intersection.

5. The path prediction system of claim 1, wherein the control module is configured to perform, based on the predicted path of the host vehicle, at least one of a forward collision warning operation or a pedestrian collision warning operation.

6. The path prediction system of claim 1, wherein the control module is configured to, based on the global navigation satellite system information, determine a location of the host vehicle, generate a safety message indicating the location of the host vehicle, and transmit the safety message.

7. The path prediction system of claim 1, wherein the control module is configured to (i) determine whether the map data of the host vehicle includes at least one of a node list or a radius of curvature of each of a plurality of vehicle paths through the intersection, and (ii) in response to the map data including the at least one of the node list or the radius of curvature of each of the plurality of vehicle paths through the intersection, use the map data to predict the path of the host vehicle.

8. The path prediction system of claim 1, wherein the control module:
determines whether the map data includes the at least one of the node list or the radius of curvature of each of the plurality of vehicle paths through the intersection; and in response to the map data not including the at least one of the node list or the radius of curvature of each of the plurality of vehicle paths through the intersection, predicts the path of the host vehicle based on the at least one of speed or yaw rate of the host vehicle.

9. The path prediction system of claim 1, wherein the control module is configured to:
determine whether the map data includes the at least one of the node list or the radius of curvature of each of the plurality of vehicle paths through the intersection; and
in response to the map data including the at least one of the node list or the radius of curvature of each of the plurality of vehicle paths through the intersection, generate a safety message based on the predicted path of the host vehicle.

10. The path prediction system of claim 1, wherein the control module (i) determines whether the host vehicle has left the intersection, and (ii) in response to the host vehicle having left the intersection, transitions from predicting the path of the host vehicle based on the map data to predicting the path of the host vehicle based on the at least one of speed or yaw rate of the host vehicle.

11. The path prediction system of claim 1, wherein the map message is received from a roadside unit, which is monitoring the intersection.

12. A path prediction system comprising:
a transceiver configured to receive a map message at a host vehicle, the map message comprising path information of vehicles through an intersection;
a memory configured to store map data including global navigation satellite system information; and
a control module configured to (i) based on the map data, determine if the host vehicle is within a predetermined distance of the intersection, at an entry point of the intersection, or within the intersection, (ii) in response to determining that the host vehicle is within the predetermined distance of the intersection, at the entry point of the intersection, or within the intersection, predict a path of the host vehicle through the intersection based on the path information, and (iii) based on the predicted path of the host vehicle, determine a location of the host vehicle, generate a safety message indicating the location of the host vehicle, and transmit the safety message,
wherein the control module is configured to i) predict the path of the host vehicle through the intersection based on at least one of a node list or a radius of curvature of a previous path of either the host vehicle or another vehicle, the node list being a list of point locations of either the host vehicle or the another vehicle along the previous path, and ii) autonomously drive the host vehicle based on the predicted path of the host vehicle through the intersection, and
wherein the control module is configured to at least one of
i) determine whether the map data includes at least one of a node list or a radius of curvature of each of a plurality of vehicle paths through the intersection, and in response to the map data not including the at least one of the node list or the radius of curvature of each of the plurality of vehicle paths through the intersection, predict the path of the host vehicle based on at least one of speed or yaw rate of the host vehicle, and
ii) determine whether the host vehicle has left the intersection, and in response to the host vehicle having left the intersection, transition from predicting the path of the host vehicle based on the map data to predicting the path of the host vehicle based on at least one of speed or yaw rate of the host vehicle.

13. The path prediction system of claim 12, wherein:
the control module is configured to predict the path of the host vehicle based on the node list and the radius of curvature of the previous path of the host vehicle or the another vehicle through the intersection; and
the map message includes the node list and the radius of curvature of the previous path of the host vehicle or the another vehicle through the intersection.

14. The path prediction system of claim 13, wherein the control module is configured to predict the path independent of speed of the host vehicle and yaw rate of the host vehicle.

15. The path prediction system of claim 12, wherein the control module is configured to (i) obtain at least one of a vehicle speed or a yaw rate of the host vehicle in the intersection, and (ii) predict the path of the host vehicle based on the at least one of the vehicle speed or yaw rate of the host vehicle in the intersection.

16. The path prediction system of claim 12, wherein the control module is configured to perform, based on the predicted path of the host vehicle, at least one of a forward collision warning operation or a pedestrian collision warning operation.

17. The path prediction system of claim 12, wherein the control module is configured to (i) determine whether the map data of the host vehicle includes at least one of a node list or a radius of curvature of each of a plurality of vehicle paths through the intersection, and (ii) in response to the map data including the at least one of the node list or the radius of curvature of each of the plurality of vehicle paths through the intersection, use the map data to predict the path of the host vehicle.

18. The path prediction system of claim 12, wherein the control module:
determines whether the map data includes the at least one of the node list or the radius of curvature of each of a plurality of vehicle paths through the intersection; and
in response to the map data not including the at least one of the node list or the radius of curvature of each of the plurality of vehicle paths through the intersection, predicts the path of the host vehicle based on at least one of speed or yaw rate of the host vehicle.

19. The path prediction system of claim 12, wherein the control module (i) determines whether the host vehicle has left the intersection, and (ii) in response to the host vehicle having left the intersection, transitions from predicting the path of the host vehicle based on the map data to predicting the path of the host vehicle based on at least one of speed or yaw rate of the host vehicle.

20. The path prediction system of claim 12, wherein the map message is received from a roadside unit, which is monitoring the intersection.

21. The path prediction system of claim 2, wherein the previous path is of the host vehicle.

22. The path prediction system of claim 6, wherein the safety message is a basic safety message comprising vehicle dynamics information including heading, speed and location of the host vehicle.

23. The path prediction system of claim 12, wherein:
the control module is configured to broadcast the safety message to multiple vehicles; and
the safety message is a basic safety message comprising vehicle dynamics information including heading, speed and location of the host vehicle.

* * * * *